(12) United States Patent
Shimura et al.

(10) Patent No.: US 8,343,240 B2
(45) Date of Patent: Jan. 1, 2013

(54) MANUFACTURING METHOD AND MANUFACTURING APPARATUS FOR FILM-COVERED ELECTRICAL DEVICE

(75) Inventors: Kenichi Shimura, Kanagawa (JP); Yuta Motohashi, Sagamihara (JP); Gen Takayama, Yokohama (JP); Masashi Watanabe, Atsugi (JP)

(73) Assignees: NEC Energy Devices, Ltd., Kanagawa (JP); Nissian Motor Co., Ltd., Kanagawa (JP)

( * ) Notice: Subject to any disclaimer, the term of this patent is extended or adjusted under 35 U.S.C. 154(b) by 29 days.

(21) Appl. No.: 12/865,206

(22) PCT Filed: Jan. 30, 2009

(86) PCT No.: PCT/JP2009/052001
§ 371 (c)(1), (2), (4) Date: Aug. 11, 2010

(87) PCT Pub. No.: WO2009/096602
PCT Pub. Date: Aug. 6, 2009

(65) Prior Publication Data
US 2011/0005050 A1  Jan. 13, 2011

(30) Foreign Application Priority Data

Jan. 31, 2008 (JP) ................. 2008-020951

(51) Int. Cl.
*H01G 9/00* (2006.01)

(52) U.S. Cl. .................... 29/25.03; 29/623.5; 29/730

(58) Field of Classification Search ............ 29/25.03, 29/623.5, 730
See application file for complete search history.

(56) References Cited

U.S. PATENT DOCUMENTS

| 6,207,318 | B1 | 3/2001 | Wessel et al. |
| 6,371,996 | B1 | 4/2002 | Takayama et al. |
| 6,743,546 | B1 * | 6/2004 | Kaneda et al. ................. 429/127 |
| 7,736,801 | B2 * | 6/2010 | Yageta et al. ................. 429/185 |
| 8,062,780 | B2 * | 11/2011 | Yageta et al. .................... 429/82 |
| 2002/0106555 | A1 | 8/2002 | Langan |
| 2003/0064284 | A1 * | 4/2003 | Yoshida et al. ............... 429/162 |
| 2004/0175609 | A1 * | 9/2004 | Yageta et al. .................... 429/82 |
| 2007/0207378 | A1 * | 9/2007 | Mizuta .......................... 429/176 |
| 2010/0255371 | A1 * | 10/2010 | Takayama et al. ............ 429/210 |

FOREIGN PATENT DOCUMENTS

| JP | 2000-133244 | 5/2000 |
| JP | 2000-182599 | 6/2000 |
| JP | 2002-298833 | 10/2002 |
| JP | 3467135 | 11/2003 |

OTHER PUBLICATIONS

Extended European Search Report issued Nov. 23, 2011 by the European Patent Office in European Application No. 09705274.0.
International Search Report, PCT/JP2009/052001, May 12, 2009.

* cited by examiner

*Primary Examiner* — Savitr Mulpuri
(74) *Attorney, Agent, or Firm* — Young & Thompson

(57) ABSTRACT

In a vacuum container (2), a bag-shaped laminate film (12) containing a battery element (11) and having an opening (12a) is pinched at positions corresponding to two principal surfaces (11a) of the battery element (11), the battery element (11) having a positive layer and a negative layer stacked via a separator. Pressure in the vacuum container (2) is reduced. An electrolytic solution (20) is poured from an electrolytic-solution supply line (4) into the bag-shaped laminate film (12) through the opening (12a) with pressure in the vacuum container (2) kept reduced until the entire battery element (11) is immersed in the electrolytic solution (20). The reduced pressure in the vacuum container (2) is increased to make the battery element (11) absorb the electrolytic solution (20) by the difference in pressure.

17 Claims, 18 Drawing Sheets

MANUFACTURING METHOD AND MANUFACTURING APPARATUS FOR FILM-COVERED ELECTRICAL DEVICE

TECHNICAL FIELD

The present invention relates to a manufacturing method and manufacturing apparatus for a film-covered electrical device, which is an electrical device element contained in laminate film, typified by a battery or capacitor.

BACKGROUND ART

Electrical devices typified by batteries and electrolytic capacitors are manufactured by filling a case which is made of metal or the like and which contains an electrode group with an electrolytic solution and then sealing the case, where the electrode group is an electrical device element.

Conventionally, a case placed upright is filled with a predetermined amount of electrolytic solution and left at rest for an extended period of time to allow the electrolytic solution to gradually permeate spaces in the electrode group. However, since an electrode group is generally made of electrode plates stacked densely, it takes time to allow the electrolytic solution to permeate the spaces in the electrode group. The case needs to be left at rest, for example, for a whole day and night in order for the electrolytic solution to permeate the spaces among the electrodes on its own. This means very inefficient production.

Also, since the electrolytic solution is absorbed very slowly, if the required amount of electrolytic solution is supplied at once into the case, the electrolytic solution will overflow the case. Methods adopted to deal with this situation include a method in which a watertight cover is placed on an opening of the case and filled with a predetermined amount of electrolytic solution. However, the method involves placing the covers one by one on the cases, making it difficult to increase manufacturing efficiency.

Japanese Patent No. 3467135 discloses an electrolytic-solution filling method intended to solve this problem. The method depressurizes an opening of a case, fills the opening with the electrolytic solution to temporarily form a pool, fills the depressurized case with the electrolytic solution, allows the electrolytic solution to permeate spaces in an electrode group, and then increases pressure in the case to make the electrolytic solution in the pool permeate the spaces in the electrode group.

By depressurizing the case once, the method expels air from the spaces in the electrode group so that the air will not obstruct permeation of the electrolytic solution. After creating a condition in which the electrode can permeate the spaces easily, the method fills the case with the electrolytic solution. Then, the method further pressurizes the case to cause the electrolytic solution in the pool to permeate. The combination of depressurization and pressurization not only reduces the time required for the electrolytic solution to be absorbed, but also prevents the electrolytic solution from spattering upon pressure release.

DISCLOSURE OF THE INVENTION

In addition to electrical devices which use a metal case, film-covered electrical devices which use a laminate material for outer covering have been developed, where the laminate material is a thin film created by laminating a metal layer of aluminum or the like and heat-fusible resin layers via adhesive layers. Generally, laminate materials have a structure in which a thin metal layer of aluminum or the like has both sides coated with a thin resin layer. The laminate materials are resistant to acid and alkali, and are lightweight and flexible.

However, the laminate film for film-covered electrical devices has flexibility, unlike metal cases. That is, the laminate film, which deforms easily, has a problem not encountered by metal cases which hardly deforms when filled with an electrolytic solution.

The electrolytic solution that is poured into an opening of the laminate film flows into between principal surfaces of the electrical device element and the laminate film without forming a pool at the opening. This is because the laminate film is flexible. Thus, the method disclosed in Japanese Patent No. 3467135 cannot be adopted as it is, where the method seals the electrical device element temporarily from the outside by means of the pool and impregnates the electrolytic solution forming the pool into the electrical device element by means of the pressure difference between the electrical device element and the outside.

Also, the electrolytic solution is not impregnated into the electrode group at uniform speed, but is impregnated irregularly depending on the area to be impregnated. The irregular impregnation with the electrolytic solution appears as creases in the surfaces of the laminate film due to the flexibility of the laminate film.

Also, the irregular impregnation with the electrolytic solution partially produces, on the surfaces, areas with low ionic conductivity between positive and negative layers, resulting in reduced electrical performance characteristics of the battery. Besides, since the laminate film deforms easily, binding forces between electrode layers are weak, and consequently the irregular impregnation can cause separators to be creased.

In view of the above circumstances, an object of the present invention is to provide a manufacturing method and manufacturing apparatus for a film-covered electrical device, where the manufacturing method and apparatus are capable of filling the film-covered electrical device with an electrolytic solution in a short time without causing irregular impregnation when impregnating the electrolytic solution or producing creases in separators.

To achieve the above object, the present invention provides a manufacturing method for a film-covered electrical device, comprising: holding, in a vacuum container, a bag-shaped laminate film that contains a power generating element and that has an opening, by pinching the bag-shaped laminate film at positions corresponding to two principal surfaces of the power generating element, the power generating element having a positive layer and a negative layer stacked via a separator; reducing pressure in the vacuum container; pouring an electrolytic solution into the bag-shaped laminate film through the opening with the pressure in the vacuum container kept reduced until the entire power generating element is immersed in the electrolytic solution; and increasing the reduced pressure in the vacuum container.

The present invention makes it possible to fill the laminate film with the electrolytic solution in a short time without producing creases in the separator.

BEST MODE FOR CARRYING OUT THE INVENTION

Next, an embodiment of the present invention will be described with reference to the drawings.

Figure 1:
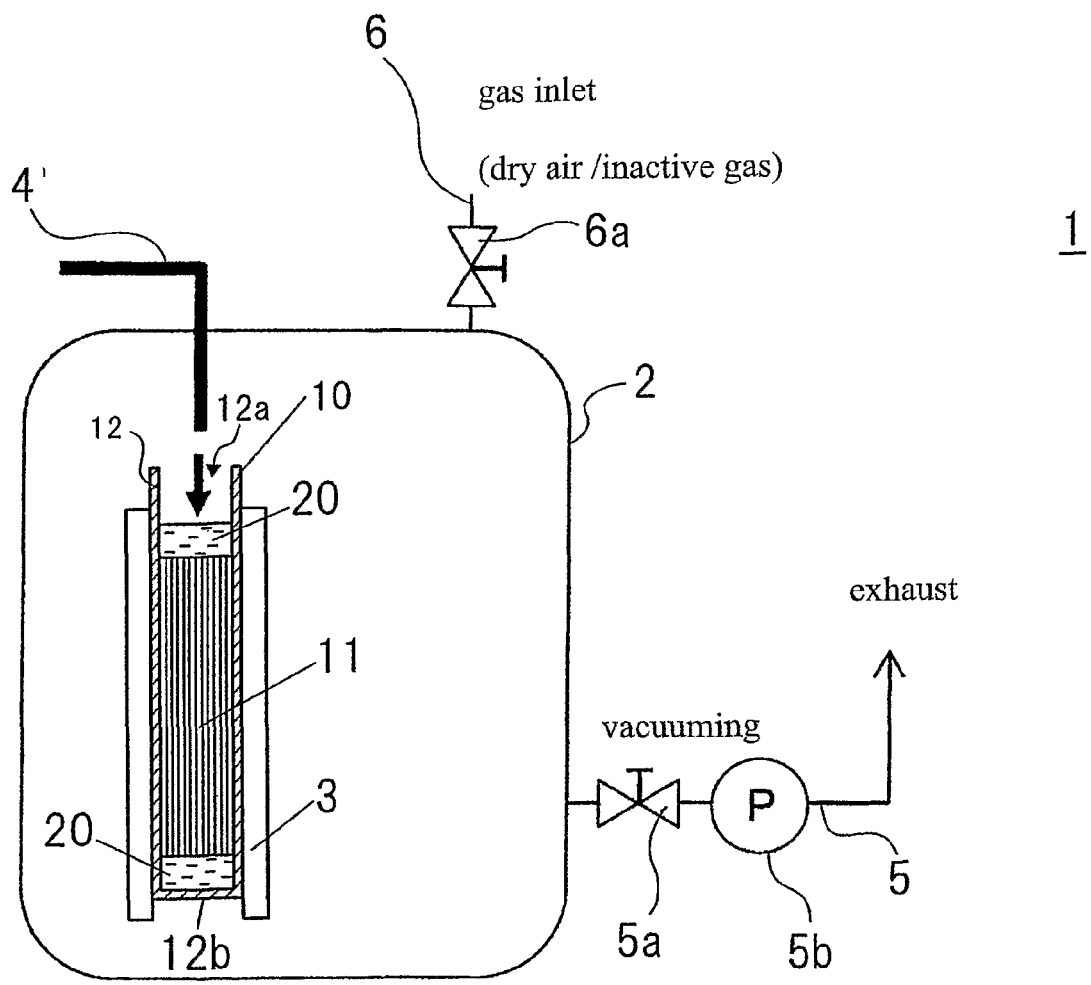
FIG. 1 is a schematic diagram showing a configuration of a filling apparatus used to fill a film-covered battery according to the present invention with an electrolytic solution.

FIG. 1 is a schematic diagram showing a configuration of a filling apparatus used to fill a film-covered battery according to the present invention with an electrolytic solution.

(Film-Covered Battery)

First, a configuration of film-covered battery 10 according to the present embodiment will be outlined.

Film-covered battery 10 includes battery element 11, a positive collector and negative collector installed on battery element 11, an outer cover made of one sheet of laminate film 12 and containing battery element 11 together with electrolytic solution 20, a positive tab connected to the positive collector, and a negative tab connected to the negative collector.

Battery element 11 includes a plurality of positive plates and negative plates stacked alternately via separators.

Figure 4:
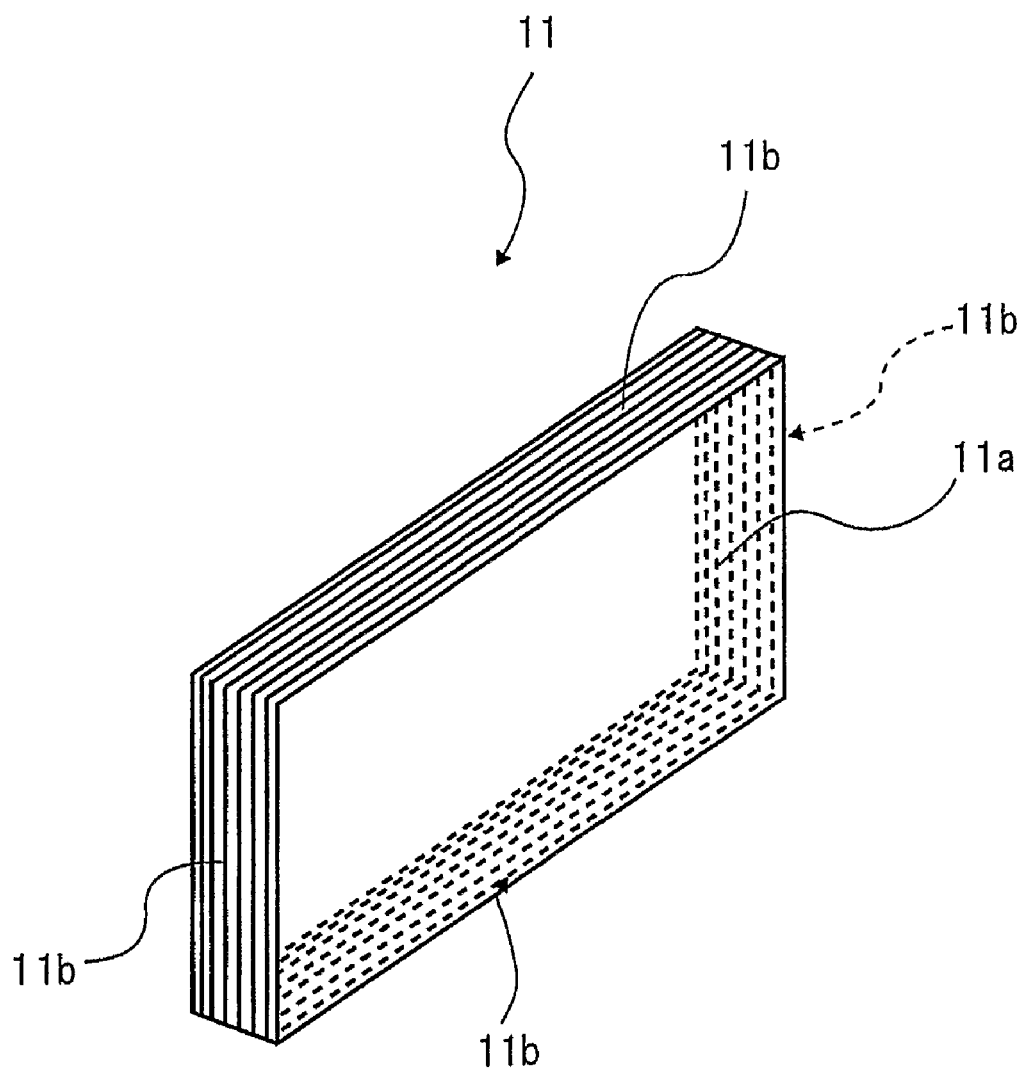
FIG. 4 is a schematic perspective view of battery elements illustrating a principal surface and edge surfaces of the battery elements.

Herein, regarding battery element 11, surfaces perpendicular to a stacking direction will be referred to as principal surfaces 11a and surfaces parallel to the stacking direction will be referred to as edge surfaces 11b, as shown in FIG. 4.

Each positive plate is made of aluminum foil coated with a positive electrode while each negative plate is made of copper foil coated with a negative electrode. Extension strips, which extend from a stack area, are not coated with electrode material. The extension strips from the positive plates are joined together by ultrasonic welding, and so are the extension strips from the negative plates, to form, respectively, the positive collector and negative collector which are relays. At the same time, the positive tab is connected to the positive collector and the negative tab is connected to the negative collector also by ultrasonic welding.

One sheet of laminate film 12 is folded into two to surround battery element 11 by sandwiching battery element 11 from both sides in the thickness direction of battery element 11. Laminate film 12 is a laminate of heat-fusible resin layer, a metal layer, and a protective layer. With the heat-fusible resin layers of PP (polypropylene) placed facing the battery, laminate film 12 seals battery element 11 as the heat-fusible resin layers are fused together by heat.

Electrolytic solution 20 is prepared using 1 mol/liter of $LiPF_6$ as a supporting electrolyte and a mixture of propylene carbonate and ethylene carbonate (ratio by mass is 50:50) as a solvent.

(Filling Apparatus)

Next, a configuration of filling apparatus 1 according to the present embodiment will be described.

Filling apparatus 1 includes vacuum container 2, holding fixture 3, electrolytic-solution supply line 4, evacuation line 5, gas inlet line 6, and controller 7.

Controller 7 controls the operation of holding fixture 3, a vacuum pump (not shown) connected to evacuation line 5, and liquid delivery system 41 connected to electrolytic-solution supply line 4. Operation of the components controlled by controller 7 will be described in detail below.

Vacuum container 2 houses holding fixture 3. Wall surfaces of vacuum container 2 are connected with electrolytic-solution supply line 4, evacuation line 5, and gas inlet line 6.

Holding fixture 3 holds bag-shaped laminate film 12 by pinching laminate film 12 from both sides (both principal surfaces 11a) in the thickness direction of battery element 11 when electrolytic solution 20 is filled into bag-shaped laminate film 12 containing battery element 11.

Preferably a space ($V_L$ in FIG. 6C) is provided below battery element 11 to pool electrolytic solution 20 as described later, and thus it is preferable to place battery element 11 above bottom surface 12b of laminate film 12, with a space provided therebetween. As shown in FIG. 6B, positive tab 104a and negative tab 104b connected to battery element 11 face away from each other. Furthermore, positive tab 104a and negative tab 104b are fixed in place beforehand, being sealed in laminate film 12. Consequently, since battery element 11 is supported by positive tab 104a and negative tab 104b, battery element 11 can be positioned, being separated from bottom surface 12b of laminate film 12.

However, laminate film 12 of film-covered battery 10 is flexible. Consequently, if electrolytic solution 20 is poured without laminate film 12 being supported in some way or other, electrolytic solution 20 will flow around to principal surfaces 11a of battery element 11 without pooling on the sides of edge surfaces 11b of battery element 11. Also, this may cause the separators to be creased if the battery element is impregnated irregularly with electrolytic solution 20.

Thus, holding fixture 3 pinches laminate film 12 at positions corresponding to principal surfaces 11a of battery element 11. This prevents poured electrolytic solution 20 from flowing around to principal surfaces 11a of battery element 11 and allows electrolytic solution 20 to be pooled once, surrounding edge surfaces 11b of battery element 11. Besides, even if the battery element is impregnated irregularly with electrolytic solution 20, holding fixture 3 holds down battery element 11 via laminate film 12 at positions corresponding to principal surfaces 11a of battery element 11, thereby preventing the separators from being creased.

Now, a configuration example of holding fixture 3 and a method for holding laminate film 12 and battery element 11 will be described more concretely.

Figure 2:
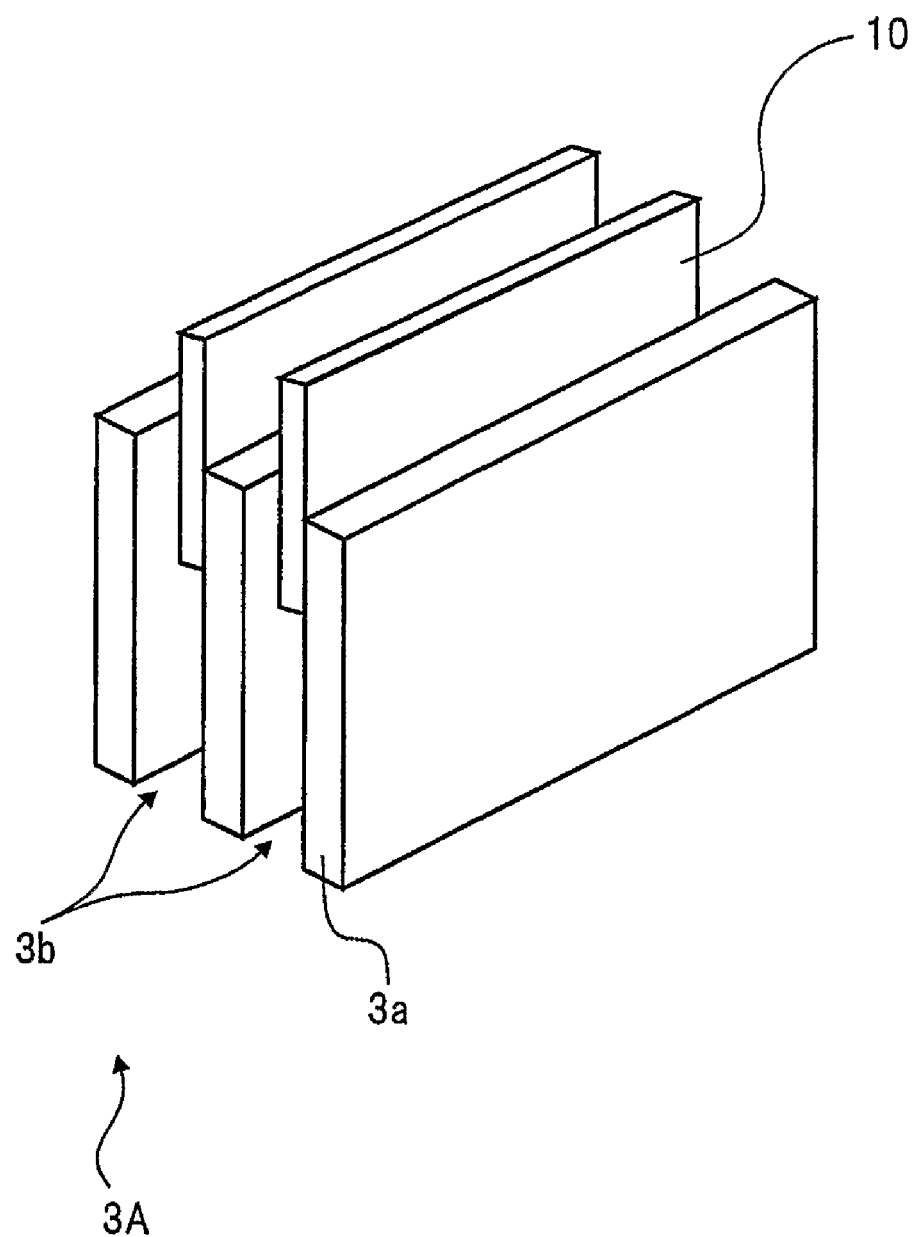
FIG. 2 is a sectional view showing an example of a holding fixture according to the present invention.

FIG. 2 shows an example of holding fixture 3. Holding fixture 3A shown in FIG. 2 includes a plurality of plate members 3a fixedly placed at predetermined intervals. The intervals between plate members 3a form sockets 3b which receive bag-shaped laminate film 12 containing battery element 11.

Figure 3:
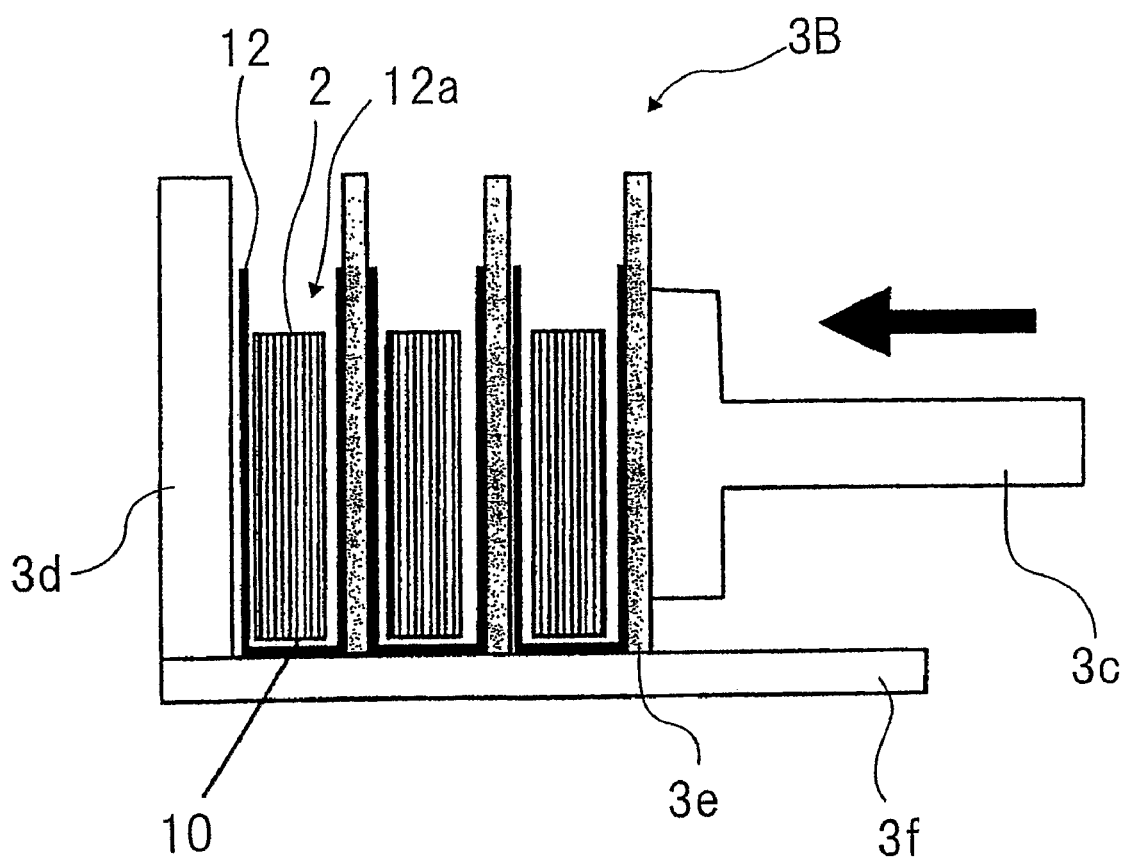
FIG. 3 is a perspective view showing another example of a holding fixture according to the present invention.

FIG. 3 shows another example of holding fixture 3. Holding fixture 3B shown in FIG. 3 has a structure in which fixed end plate 3d and a plurality of movable plates 3e placed at predetermined intervals are mounted on a base 3f. Fixed end plate 3d is mounted at an end of base 3f. A plurality of movable plates 3e are arranged parallel to fixed end plate 3d. Fixed end plate 3d is fixed to base 3f. On the other hand, movable plates 3e are installed in such a way as to be movable on base 3f. Piston 3c is installed on the side opposite to fixed end plate 3d. Piston 3c pushes movable plate 3e mounted at the end opposite to fixed end plate 3d.

As shown in FIG. 3, pieces of bag-shaped laminate film 12 containing battery element 11 are inserted one each between fixed end plate 3d and movable plate 3e or between each pair of adjacent movable plates 3e. When piston 3c pushes movable plates 3e, pushing force is applied to bag-shaped laminate film 12 containing battery element 11. That is, holding fixture 3B can adjust pushing force on film-covered battery 10 during filling with the electrolytic solution.

Incidentally, in FIG. 1, bag-shaped laminate film 12 containing battery element 11 is pinched by holding fixture 3 in such a way that positive tab 104a and negative tab 104b described later will face in a direction perpendicular to the plane of the paper.

Laminate film 12 containing battery element 11 and being pinched by holding fixture 3 has been shaped like a bag. That is, laminate film 12 is heat-fused on three sides other than the side along which laminate film 12 is folded. Specifically, laminate film 12 has been heat-fused on the two sides from which positive tab 104a and negative tab 104b extend, but the side opposite the folded side has not yet been heat-fused. Laminate film 12 is bag-shaped to allow electrolytic solution 20 to be poured through the side has not yet been heat-fused with the side serving as opening 12a. That is, in FIG. 1, holding fixture 3 pinches bag-shaped laminate film 12 from both sides in the thickness direction of battery element 11 with the unfused side up in such a way that positive tab 104a and negative tab 104b will face in the direction perpendicular to the plane of the paper. Incidentally, although one sheet of laminate film 12 folded into two is taken as an example according to the present embodiment, the present invention is not limited to this and two sheets of laminate film may be used alternatively. In that case, the laminate film is shaped like a bag in advance by heat-fusing three sides.

One end of electrolytic-solution supply line 4 is connected to a tank (not shown) which stores the electrolytic solution. The other end is installed on an upper wall of vacuum container 2, being positioned such that electrolytic solution 20 supplied through electrolytic-solution supply line 4 can be poured through opening 12a of laminate film 12 which opens upward.

Evacuation line 5, which is used to evacuate vacuum container 2, has valve 5a and vacuum pump 5b.

Gas inlet line 6 is used to introduce dry air or inert gas into vacuum container 2 evacuated by evacuation line 5 and thereby break the vacuum in vacuum container 2. Gas inlet line 6 includes valve 6a and a gas storage tank (not shown).

(Pressure Range of Pushing Force)

Next, description will be given of a pressure range of the pushing force exerted by holding fixture 3 on film-covered battery 10 which is being filled with the electrolytic solution.

If excessive pressure is applied by holding fixture 3 to principal surfaces 11a of battery element 11, battery element 11 will be squeezed excessively, preventing electrolytic solution 20 from infiltrating the battery element. Consequently, pores in the separators and electrodes cannot be impregnated with electrolytic solution 20. This is because electrolytic solution 20 enters the battery element mainly by seeping into contact surfaces of the separators and electrodes by capillary action, and the application of too much pressure makes it difficult for the solution to infiltrate the contact surfaces. On the other hand, if the applied pressure is too low, spaces may be formed among positive plates, separators, and negative plates, electrolytic solution 20 may infiltrate into the spaces, causing the separators to lose firmness or become creased, and the creases may remain after the battery is completed.

Figure 5:
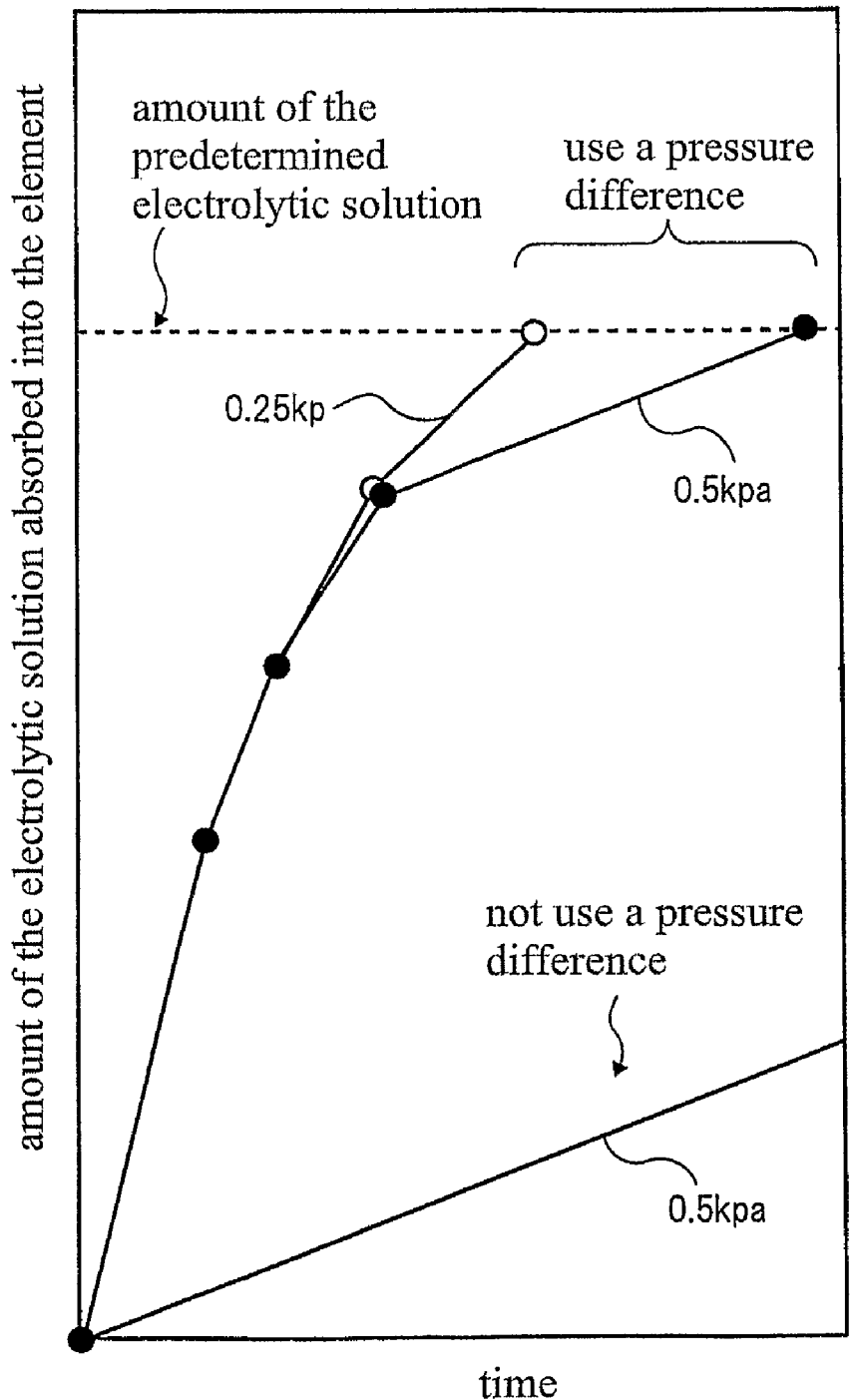
FIG. 5 is a graph showing a relationship between the time required for filling and amount of the electrolytic solution absorbed into element, where a pushing force on the principal surface is used as a parameter.

A relationship between the time required for filling and amount of the electrolytic solution absorbed into element is shown in FIG. 5, where a pushing force on the principal surface is used as a parameter.

FIG. 5 shows measurement results obtained by a filling method which uses the pressure difference and measurement results obtained by a filling method which does not use a pressure difference. The filling method which uses a pressure difference is a method in which electrolytic solution 20 pooled at locations facing edge surfaces 11b is sucked by the negative pressure of battery element 11 kept under vacuum. This method is a feature of the present invention and will be described in detail later. On the other hand, the method which does not use a pressure difference is a method which causes battery element 11 to be impregnated with electrolytic solution 20 by gravity, by the capillary action of the contact surfaces between the electrodes and separators, and by the capillary action of the pores in the separators without creating any pressure difference between the inside and outside of battery element 11.

Regarding the filling method which uses a pressure difference, an experiment was conducted under two conditions: the pushing force of holding fixture 3 was set to 0.25 kPa and 0.5 kPa. Regarding the filling method which does not use a pressure difference, the experiment was conducted only under one condition: the pushing force of holding fixture 3 was set to 0.5 kPa.

It can be seen from FIG. 5, that the time required for filling with a prescribed amount of electrolytic solution is shorter when the pressure of 0.25 kPa is applied than when the pressure of 0.5 kPa is applied. At first, battery element 11 is impregnated with the electrolytic solution at approximately the same rate under 0.25 kPa and 0.5 kPa, but toward the end of filling, i.e., when the prescribed amount of electrolytic solution has been almost filled, the impregnation rate slows down and thus a longer time is required for filling when the higher pressure of 0.5 kPa is used. In short, if the pushing force exerted by holding fixture 3 is too high, a longer time will be required for filling.

However, even if the same pressure of 0.5 kPa is used, the filling method which uses a pressure difference can finish filling in a far shorter time than the filling method which does not use a pressure difference.

In the above experiment, to prevent the impregnation rate from slowing down toward the end of filling, the pushing force of the holding fixture may be reduced gradually as the filling proceeds from the initial stage to the end of impregnation. Also, the pushing force of the holding fixture may be reduced to almost zero near the end of impregnation.

(Electrolytic-Solution Filling Method)

Figure 18:
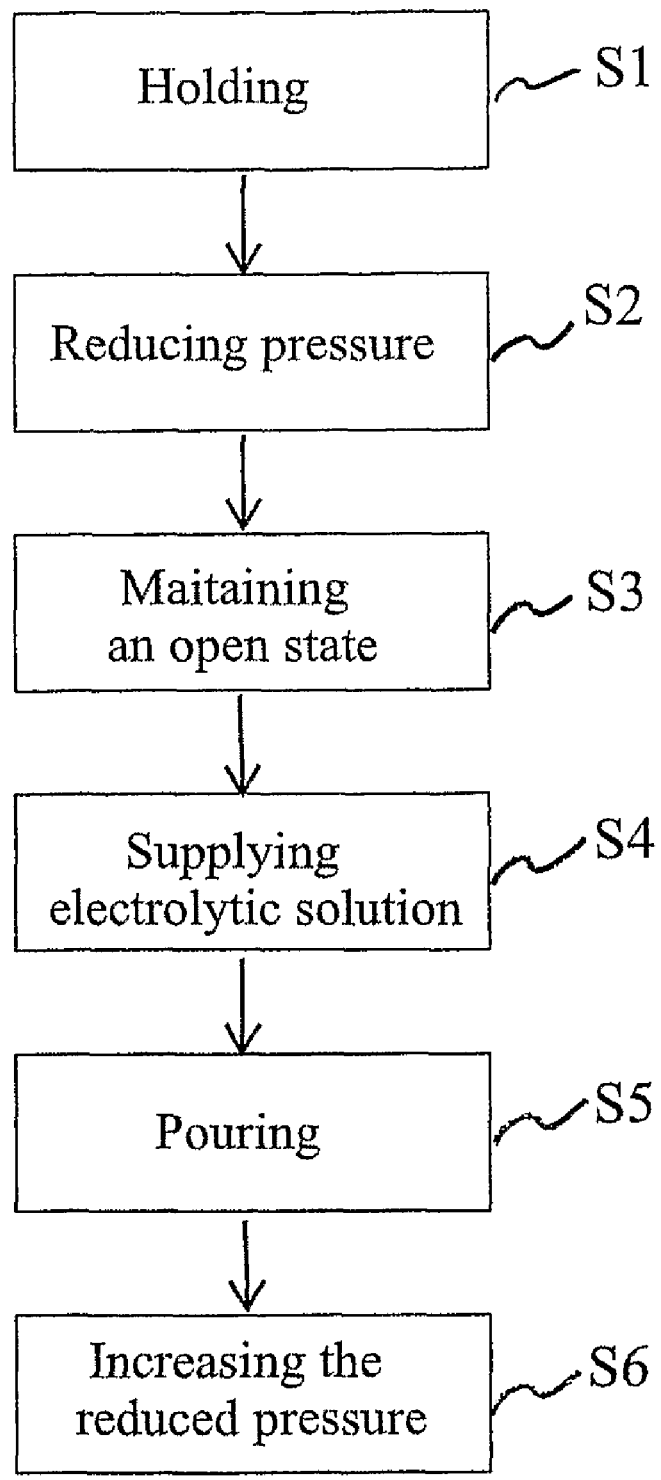
FIG. 18 is a flowchart illustrating a manufacturing method for a film-covered electrical device according to the present invention.

Next, a method of filling with electrolytic solution 20 using filling apparatus 1 according to the present embodiment will be described with reference to a flowchart of FIG. 18.

The method of filling with electrolytic solution 20 according to the present embodiment fills battery element 11 with electrolytic solution 20 using a pressure difference. The following procedures are used for filling with electrolytic solution 20.

First, in vacuum container 2, filling apparatus 1 pinches laminate film 12 containing battery element 11 using holding fixture 3 and thereby holds the entire principal surfaces of battery element 11 (Step S1). When laminate film 12 is held by holding fixture 3, the top side of laminate film 12 containing battery element 11 forms opening 12a which remains to be heat-fused.

Next, with valve 5a open, filling apparatus 1 operates vacuum pump 5b of evacuation line 5 to depressurize vacuum container 2 (Step S2). When a predetermined degree of vacuum is reached, filling apparatus 1 closes valve 5a. In this state, the pressures in vacuum container 2 and in battery element 11 contained therein have equally been reduced to a predetermined level.

Next, using a mechanism for maintaining an open state (described later), filling apparatus 1 maintains opening 12a of laminate film 12 in an open state (Step S3).

Next, filling apparatus 1 supplies electrolytic solution 20 through electrolytic-solution supply line 4 (Step S4) and pours supplied electrolytic solution 20 through opening 12a at the top of laminate film 12 (Step S5). Incidentally, the supplying of electrolytic solution 20 through electrolytic-solution supply line 4 will be described in detail later. Since battery element 11 has its entire principal surfaces held in the thickness direction by holding fixture 3, there is no space for electrolytic solution 20 to flow in on the sides of principal surfaces 11a. Also, since battery element 11 is held by holding fixture 3, there is little space among the positive plates, separators, and negative plates for electrolytic solution 20 to flow in. Furthermore, the pressures in vacuum container 2 and in battery element 11 contained therein have equally been reduced to a predetermined level. Consequently, electrolytic solution 20 is not sucked into battery element 11 by negative pressure in battery element 11. Electrolytic solution 20 is poured until entire battery element 11 is immersed in electrolytic solution 20. Consequently, electrolytic solution 20 is pooled on the sides of edge surfaces 11b of battery element 11. That is, of the six surfaces of battery element 11, four surfaces—top, bottom, and two lateral edge surfaces—excluding principal surfaces 11a are surrounded by electrolytic solution 20.

Next, filling apparatus 1 opens valve 6a of gas inlet line 6 to introduce gas into vacuum container 2, and thereby increases the pressure in vacuum container 2 (Step S6). Although the introduction of gas raises the pressure in vacuum container 2, the inside of battery element 11 surrounded by electrolytic solution 20 remains depressurized as a result of evacuation. Consequently, there is a pressure difference between the inside of battery element 11 surrounded by electrolytic solution 20 and the inside of vacuum container 2. That is, since there is a vacuum in battery element 11, electrolytic solution 20 is sucked into battery element 11 by the negative pressure, thereby filling battery element 11 with electrolytic solution 20 rapidly.

Moreover, although electrolytic solution 20 enters through four edge surfaces 11b, since the entire principal surfaces of battery element 11 are held by holding fixture 3, electrolytic solution 20 does not enter through the principal surfaces. This prevents the separators from being creased. In the above example, holding fixture 3 holds the entire areas of principal surfaces 11a of battery element 11, and this is most desirable. However, the operation and effect of the present invention can be achieved even if there are areas which are not held by holding fixture 3 in part of principal surfaces 11a. For example, most parts of principal surfaces 11a including the centers may be held, leaving peripheral parts.

Incidentally, if the amount of electrolytic solution 20 which can be pooled around edge surfaces 11b is less than the amount required for film-covered battery 10, the above processes may be repeated beginning with the process of pouring electrolytic solution 20 until the required amount is reached. Also, the process of pouring the electrolytic solution and the process of raising the pressure in vacuum container 2 may be performed simultaneously. One of the processes may be performed continuously while the other process is performed intermittently.

As described above, although flexible laminate film is used as covering material for the battery, the method of filling with electrolytic solution 20 according to the present invention can keep laminated surfaces taut and flat, prevent the separators from being creased during filling with electrolytic solution 20, and carry out filling rapidly.

(Pooling Conditions of Electrolytic Solution)

Next, pooling conditions of electrolytic solution 20 according to the present embodiment will be described with reference to FIGS. 6A to 6C.

Battery element 11 is impregnated with electrolytic solution 20 through edge surfaces 11b of battery element 11. Battery element 11, which is rectangular in shape, has four edge surfaces 11b. To reduce the filling time and prevent creasing of laminate film 12, it is important to fill battery element 11 with electrolytic solution 20 using all four edge surfaces 11b effectively.

Figure 6A:
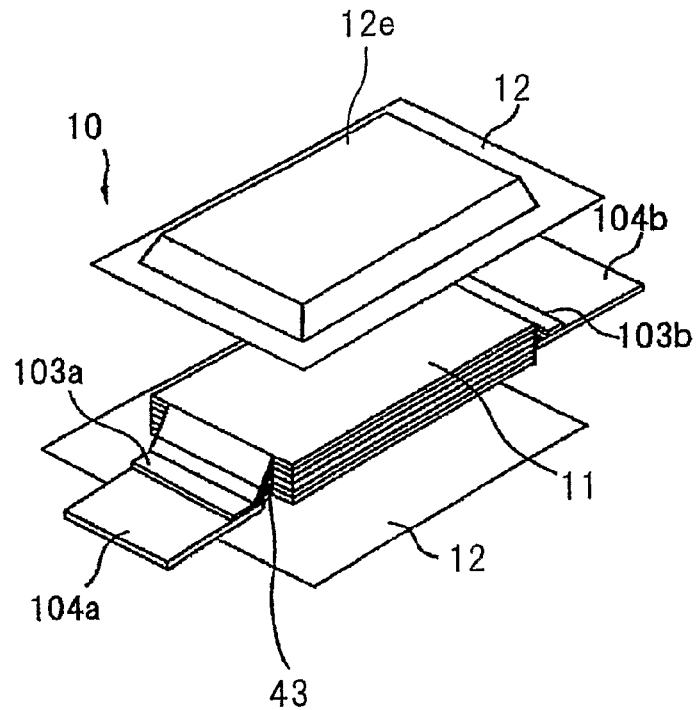
FIG. 6A is a perspective view of a film-covered electrical device which is an application example of the present invention.
Figure 6B:
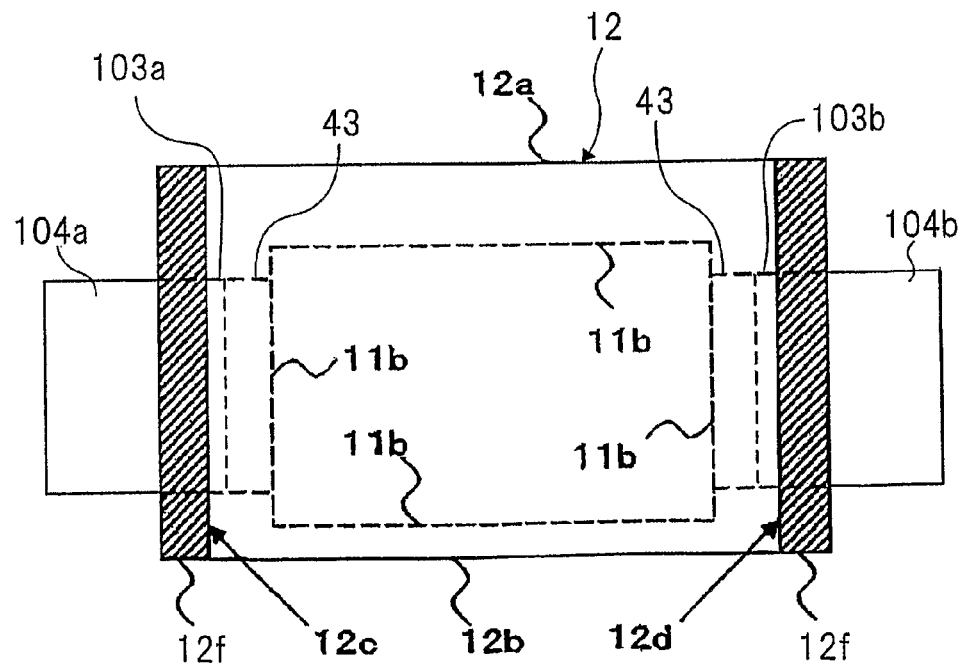
FIG. 6B is a front view of a film-covered electrical device which is another application example of the present invention.

FIG. 6A is a perspective view of a film-covered electrical device which is an application example of the present invention. Extension strip 43 made of metal foil and used to draw electric current extends from the electrode in each layer of battery element 11. Extension strips 43 of the positive layers are connected to positive tab 104a in positive collector 103a. Similarly, extension strips 43 of the negative layers are connected to negative tab 104b in negative collector 103b. The film-covered electrical device shown in FIG. 6A has recess 12e formed in laminate film 12 to house battery element 11. The film-covered electrical device shown in FIG. 6A is a type in which two sheets of laminate film are stacked face to face and the four sides are sealed.

However, the film-covered electrical device according to the present invention may use flat laminate film without a recess. Alternatively, the present invention may be applied to a film-covered electrical device of a type in which three sides are sealed by folding a single sheet of laminate film. A front view of such an example is shown in FIG. 6B. In FIG. 6B, bottom surface 12b is folded to form a side.

Figure 6C:
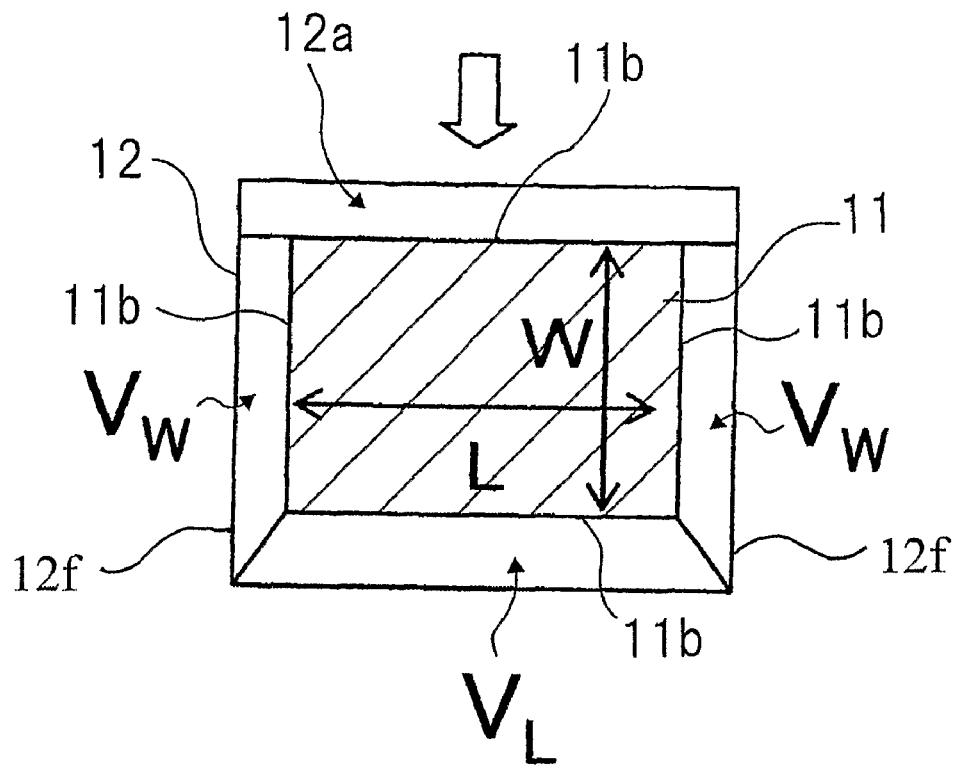
FIG. 6C is a schematic diagram of a battery element accommodated in a laminate film as viewed in the direction of a principal surface to illustrate pooling conditions of the electrolytic solution.

FIG. 6C, which is a schematic diagram of a battery element accommodated in a laminate film as viewed in the direction of a principal surface, illustrates pooling conditions of the electrolytic solution. FIG. 6C shows a part surrounded by sides 12a, 12b, 12c, and 12d (sides 12c and 12d correspond to inner borders of sealing) in FIG. 6B. Incidentally, positive tab 104a, negative tab 104b, extension strips 43, positive collector 103a, and negative collector 103b are omitted in FIG. 6C.

Regarding the size of battery element 11, the length is denoted by L and the width is denoted by W. Inner space of laminate film 12 is larger in size than battery element 11. Electrolytic solution 20 is pooled temporarily in spaces produced by the size difference. Each space is formed by one of edge surfaces 11b of battery element 11 and sealed end 12f closest to edge surface 11b or the bend of the laminate film. Hereinafter, the volumes of the spaces will be referred to as pooling volumes.

In FIG. 6C, the pooling volumes on both sides of film-covered battery 10 placed in a vertical position are denoted by $V_W$ and the pooling volume at the bottom is denoted by $V_L$.

Pooling volumes $V_W$ of two spaces are shown in FIG. 6C: the space formed by left edge surface 11b and left sealed end 12f, and the space formed by right edge surface 11b and right sealed end 12f. That is, pooling volumes $V_W$ are volumes of the spaces formed between the edges of laminate film 12 and two edge surfaces 11b which join the other two edge surfaces 11b of battery element 11—edge surface 11b located at opening 12a and edge surface 11b located at the bottom (opposite to edge surface 11b located at opening 12a).

On the other hand, pooling volume $V_L$ is the volume of space formed by edge surface 11b at the bottom and the bend of laminate film 12 (the base of laminate film 12). That is, pooling volume $V_L$ is the volume of space formed between an edge of laminate film 12 and one of edge surfaces 11b of battery element 11, i.e., bottom edge surface 11b opposite to edge surface 11b located at opening 12a.

The upper border of $V_W$ is flush with the upper end of battery element 11. Also, pooling volumes $V_W$ and pooling volume $V_L$ are bounded by lines each of which joins a corner of battery element 11 and a corner of laminate film 12. If there are some other objects in the spaces, the volumes occupied by the objects are deducted. Examples of the other objects as mentioned here include extension strips 43, positive collector 103a, and negative collector 103b in FIG. 6B as well as insulating coating members covering the collectors.

A necessary condition for pooling electrolytic solution 20 on a side of edge surface 11b located at opening 12a, i.e., in the upper part, is given by:

$$0 < 2V_W + V_L < V_{TOTAL} \quad (1)$$

where $V_{TOTAL}$ is the total volume of electrolytic solution 20 poured into laminate film 12 during filling.

On the other hand, a condition for filling electrolytic solution 20 into the separators not only through edge surface 11b at opening 12a, but also through edge surfaces 11b on both sides and at the bottom is given by:

$$0 < V_W, \ 0 < V_L \quad (2)$$

To pour electrolytic solution 20 through all four edge surfaces 11b, it is necessary to satisfy condition equations (1) and (2).

Figure 7:
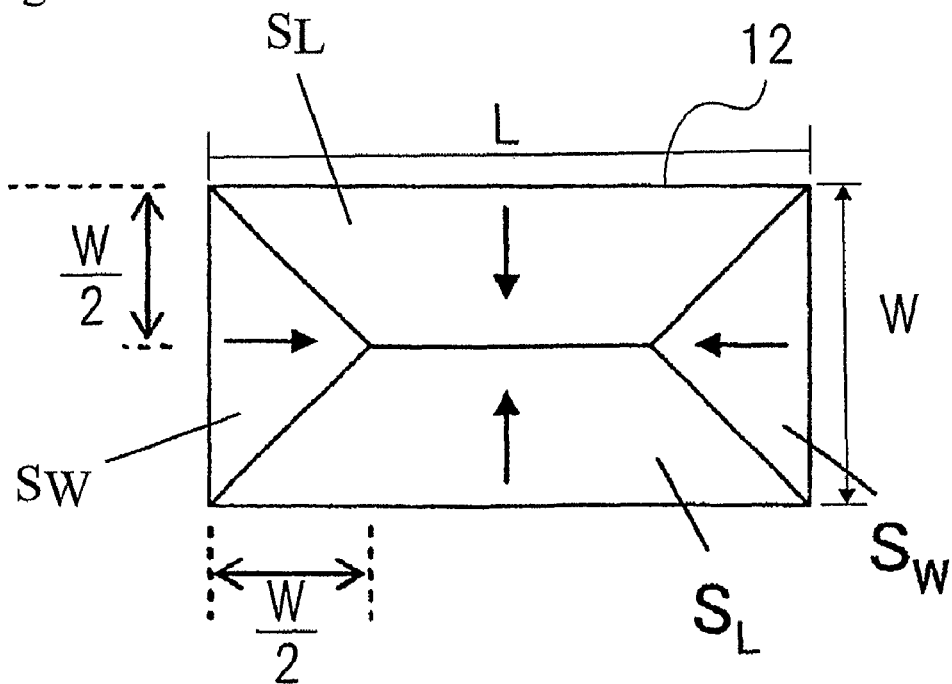
FIG. 7 is a schematic diagram of a battery element divided into four areas into which the electrolytic solution permeates through respective four edge surfaces.

Next, the amounts of electrolytic solution 20 absorbed through four edge surfaces 11b—edge surface 11b at opening 12a, edge surfaces 11b on both sides, and edge surface 11b at the bottom—will be estimated. FIG. 7 shows a schematic diagram of battery element 11 divided into four areas into which electrolytic solution 20 permeates through respective four edge surfaces 11b.

Area $S_W$ is a surface area of the area into which electrolytic solution 20 infiltrates through each of edge surfaces 11b on both sides. Area $S_L$ is a surface area of the area into which electrolytic solution 20 infiltrates through edge surface 11b at opening 12a or edge surface 11b at the bottom. Area $S_W$ and area $S_L$ are given as follows using length L and width W:

$$S_W = 1/2 \times W/2 \times W = W^2/4 \quad (3)$$

$$S_L = WL/2 - W^2/4 \quad (4)$$

The ratio between the amounts of electrolytic solution 20 absorbed through two groups of edge surfaces 11b per unit time is given by:

$$S_W : S_L = W^2/4 : (W/2) \cdot (L - W/2) = W/2 : L - W/2 \quad (5)$$

When electrolytic solution 20 is absorbed through all four edge surfaces 11b, ideally absorption through all four edge surfaces 11b will be finished simultaneously.

It is not desirable that absorption of electrolytic solution 20 through edge surfaces 11b on both sides be finished earlier than absorption through edge surface 11b at the bottom. Reasons for this will be described with reference to FIGS. 8A and 8B.

Figure 8A:
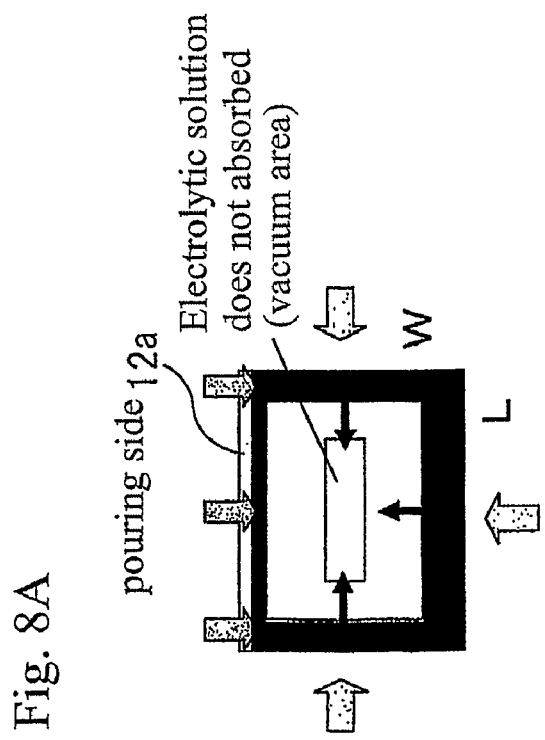
FIG. 8A is a schematic diagram illustrating how the electrolytic solution is absorbed through the edge surfaces in a final stage of filling.
Figure 8B:
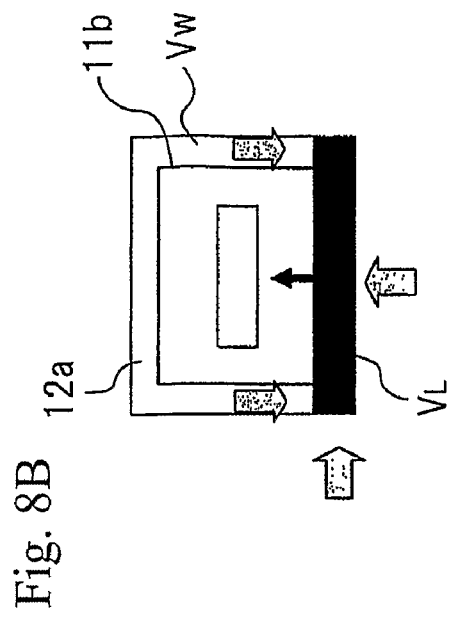
FIG. 8B is a schematic diagram showing how the electrolytic solution pooled at top and on both sides has been absorbed before the electrolytic solution pooled in the bottom is absorbed.

At a stage shown in FIG. 8A, filling with electrolytic solution 20 is carried out through all four edge surfaces 11b. Then, it is assumed that the filling proceeds to its final stage shown in FIG. 8B. In FIG. 8B, electrolytic solution 20 pooled above edge surface 11b at opening 12a and in the spaces of pooling volume $V_W$ on both sides has been absorbed. On the other hand, electrolytic solution 20 pooled in the space of pooling volume $V_L$ on a side of edge surface 11b at the bottom has not yet been absorbed. Electrolytic solution 20 remaining at this time has to be absorbed only through edge surface 11b at the bottom, thus extending the time until the completion of filling.

Even if absorption does not finish all at once, if absorption through edge surface 11b at the bottom finishes earlier than absorption through edge surfaces 11b on both sides, there is no problem. Reasons for this will be described with reference to FIG. 8C.

Figure 8C:
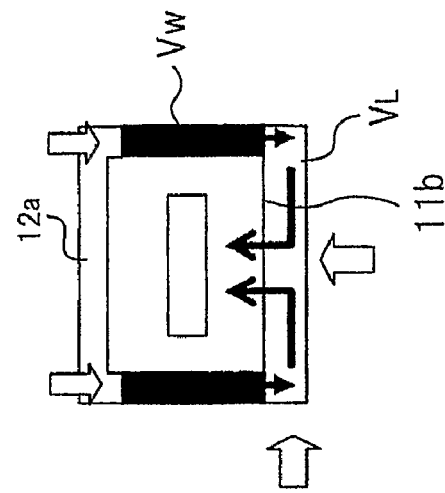
FIG. 8C is a schematic diagram showing how the electrolytic solution pooled at top and on both sides is being absorbed after the electrolytic solution pooled in the bottom has been absorbed.

It is assumed that the filling proceeds to its final stage shown in FIG. 8C. In FIG. 8C, electrolytic solution 20 pooled above edge surface 11b at opening 12a and electrolytic solution 20 pooled in the space of pooling volume $V_L$ on the side of edge surface 11b at the bottom have been absorbed. On the other hand, electrolytic solution 20 pooled in the spaces of pooling volume $V_W$ on both sides has not yet been absorbed. In this case, electrolytic solution 20 remaining in the spaces of pooling volume $V_W$ on both sides flows to edge surface 11b at the bottom by gravity. Thus, even after all electrolytic solution 20 in the space of pooling volume $V_L$ has been absorbed through edge surface 11b at the bottom, edge surface 11b at the bottom can absorb electrolytic solution 20 which flows in without being absorbed through edge surfaces 11b on both sides. This makes it possible to reduce the time required for filling the battery with electrolytic solution 20.

Conditions for at least absorption through edge surface 11b at the bottom to finish earlier than absorption through edge surfaces 11b on both sides are given by:

$$V_L/S_L \leq V_W/S_W$$

$$V_L \leq (S_L/S_W) \cdot V_W$$

$$V_L \leq (2/W) \cdot (L-W/2) \cdot V_W \quad (6)$$

Thus, filling conditions which need to be satisfied in order to fill electrolytic solution 20 into battery element 11 in a short time are given by above condition equations (1), (2), and (6).

(System for Supplying Electrolytic Solution)

Next, a system for supplying an electrolytic solution with the filling apparatus according to the present embodiment will be described.

In FIG. 1 intended to illustrate a basic configuration of the present invention, a single film-covered battery 10 is housed in vacuum container 2 and a single electrolytic-solution supply line 4 is provided.

Figure 9:
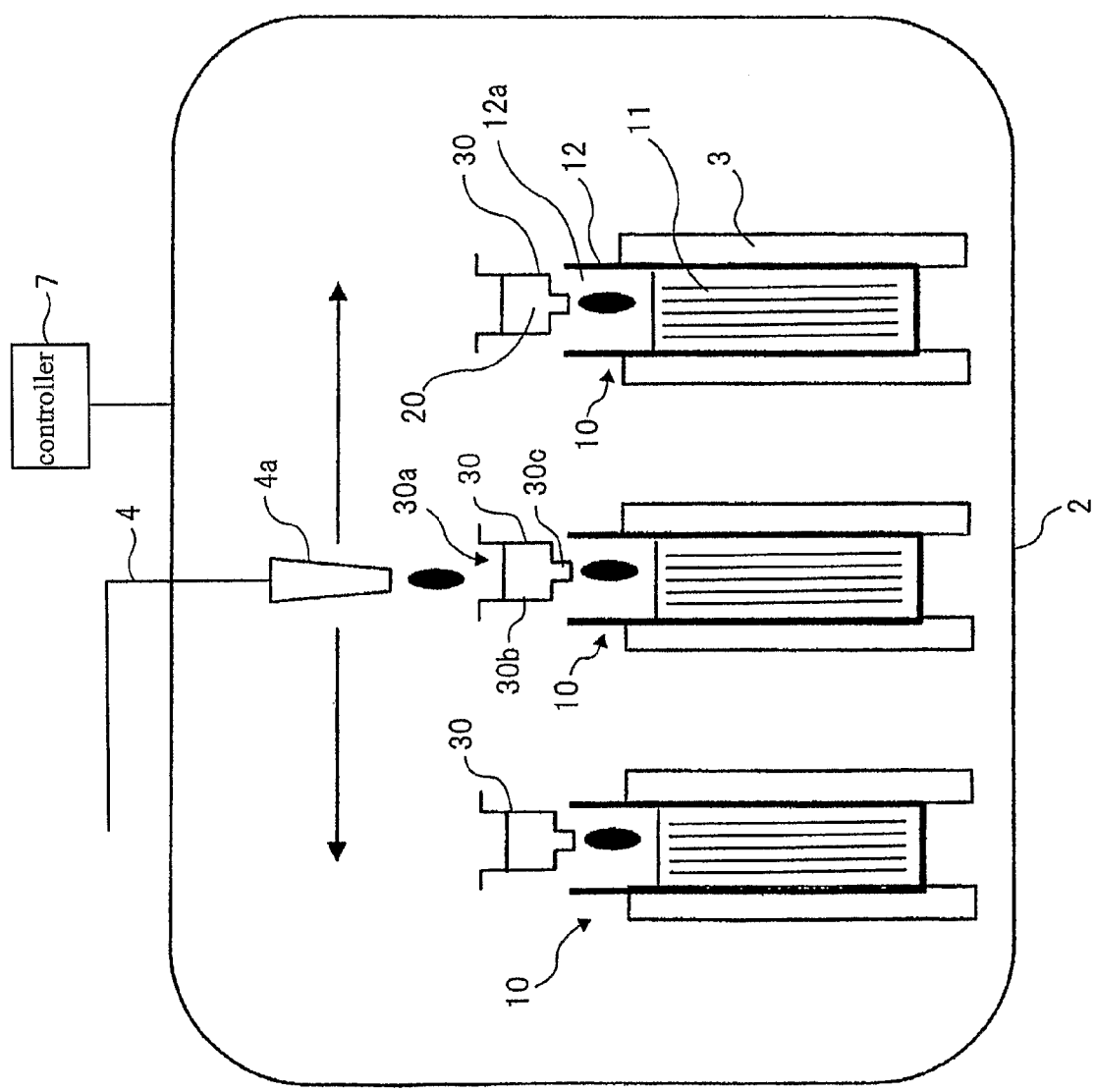
FIG. 9 is a schematic diagram showing an example of a system for supplying an electrolytic solution to bag-shaped laminate film containing a plurality of battery elements.

FIG. 9 shows an example of a system for supplying an electrolytic solution to a plurality of film-covered batteries.

A filling apparatus shown in FIG. 9 includes a plurality of holding fixtures 3, relay containers 30 installed for respective holding fixtures 3, and needle 4a connected to electrolytic-solution supply line 4, all of which are housed in vacuum container 2.

Needle 4a is installed in such a way as to be able to move above holding fixtures 3.

Each relay container 30 has opening 30a, main body 30b, and supply port 30c. Opening 30a receives electrolytic solution 20 supplied from needle 4a. Main body 30b temporarily pools electrolytic solution 20. Supply port 30c supplies electrolytic solution 20 temporarily pooled in main body 30b into bag-shaped laminate film 12 containing battery element 11. Relay containers 30 are installed above openings 12a of respective pieces of laminate film 12 and below needle 4a.

With the present configuration, electrolytic solution 20 is not supplied directly into bag-shaped laminate film 12 containing battery element 11. That is, with the present configuration, electrolytic solution 20 is supplied into bag-shaped laminate film 12 via relay containers 30 which temporarily pool electrolytic solution 20 supplied from needle 4a.

According to the present embodiment, electrolytic solution 20 is supplied as follows.

First, needle 4a supplies electrolytic solution 20 into one relay container 30. Electrolytic solution 20 is pooled in relay container 30 and then supplied into bag-shaped laminate film 12. In the meantime, needle 4a supplies electrolytic solution 20 into adjacent another relay container 30. Electrolytic solution 20 is pooled in given relay container 30 and then supplied into bag-shaped laminate film 12. In this way, according to the present embodiment, electrolytic solution 20 is pooled in relay containers 30 once before being supplied into bag-shaped laminate film 12.

As described above, according to the present embodiment, electrolytic solution 20 is supplied into different pieces of bag-shaped laminate film 12 by moving needle 4a. However, the amount of electrolytic solution 20 absorbed by battery element 11 can exceed the amount of electrolytic solution 20 supplied from traveling needle 4a. To deal with this, in supplying electrolytic solution 20 to multiple pieces of bag-shaped laminate film 12 by moving single needle 4a, the system pools electrolytic solution 20 temporarily in relay containers 30 while supplying electrolytic solution 20 in the meantime to different pieces of bag-shaped laminate film 12 one after another by moving needle 4a.

Figure 10:
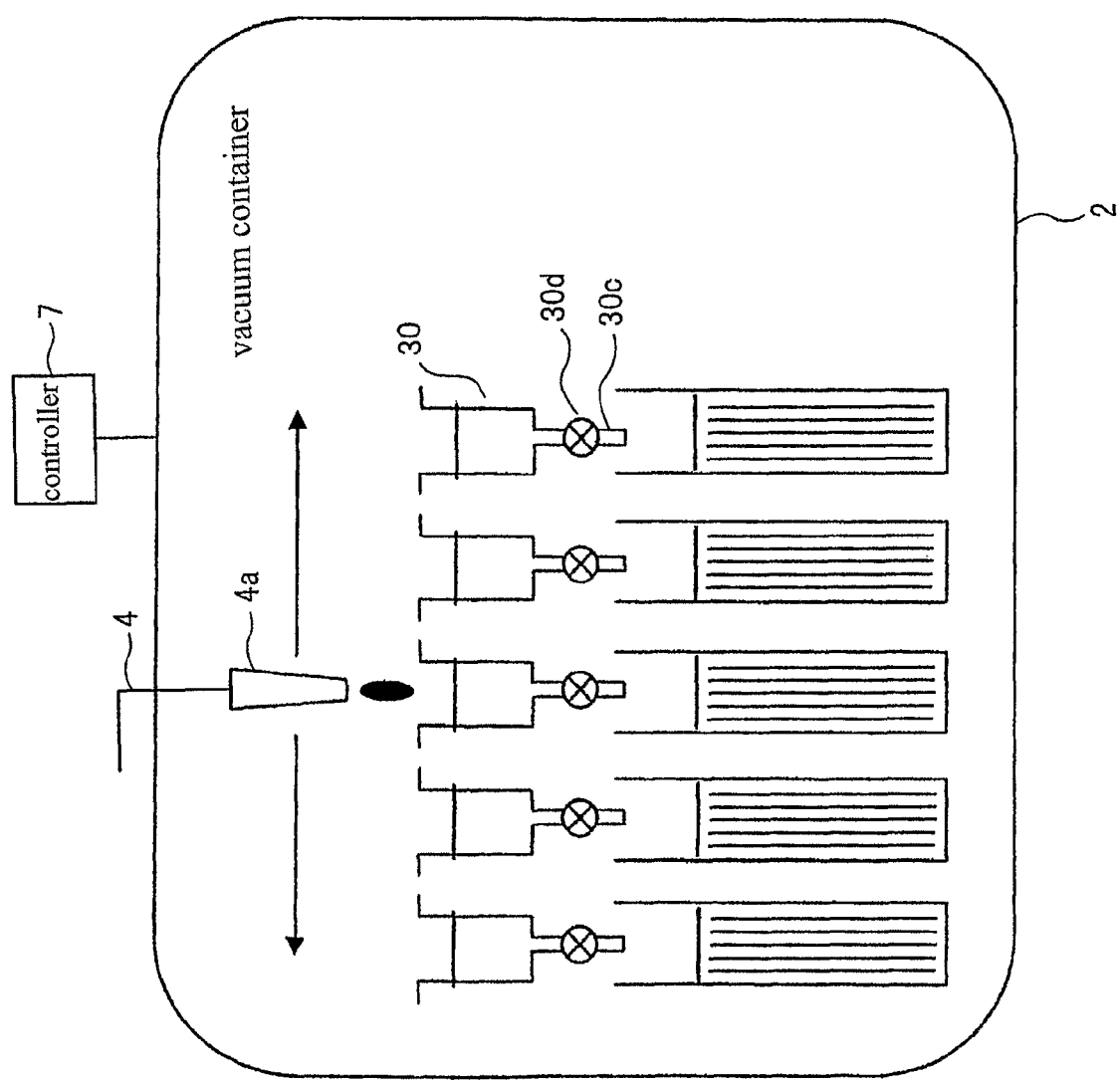
FIG. 10 is a schematic diagram showing another example of a system for supplying an electrolytic solution to bag-shaped laminate film containing a plurality of battery elements.

FIG. 10 shows another example of a system for supplying an electrolytic solution to bag-shaped laminate film 12 containing a plurality of battery elements 11.

Configuration shown in FIG. 10 is the same as the configuration in FIG. 9 except that valve 30d is installed at supply port 30c of each relay container 30. According to the present configuration, electrolytic solution 20 is temporarily pooled in relay containers 30 with valves 30d closed and when electrolytic solution 20 is pooled in all relay containers 30, electrolytic solution 20 can be supplied into different pieces of bag-shaped laminate film 12 all together by opening all valves 30d at once. This makes it possible to supply electrolytic solution 20 into different pieces of bag-shaped laminate film 12 uniformly without being affected by the traveling speed of needle 4a, the supply rate of electrolytic solution 20 that is supplied by needle 4a, the supply rate of electrolytic solution 20 from relay containers 30, or the like.

Figure 11:
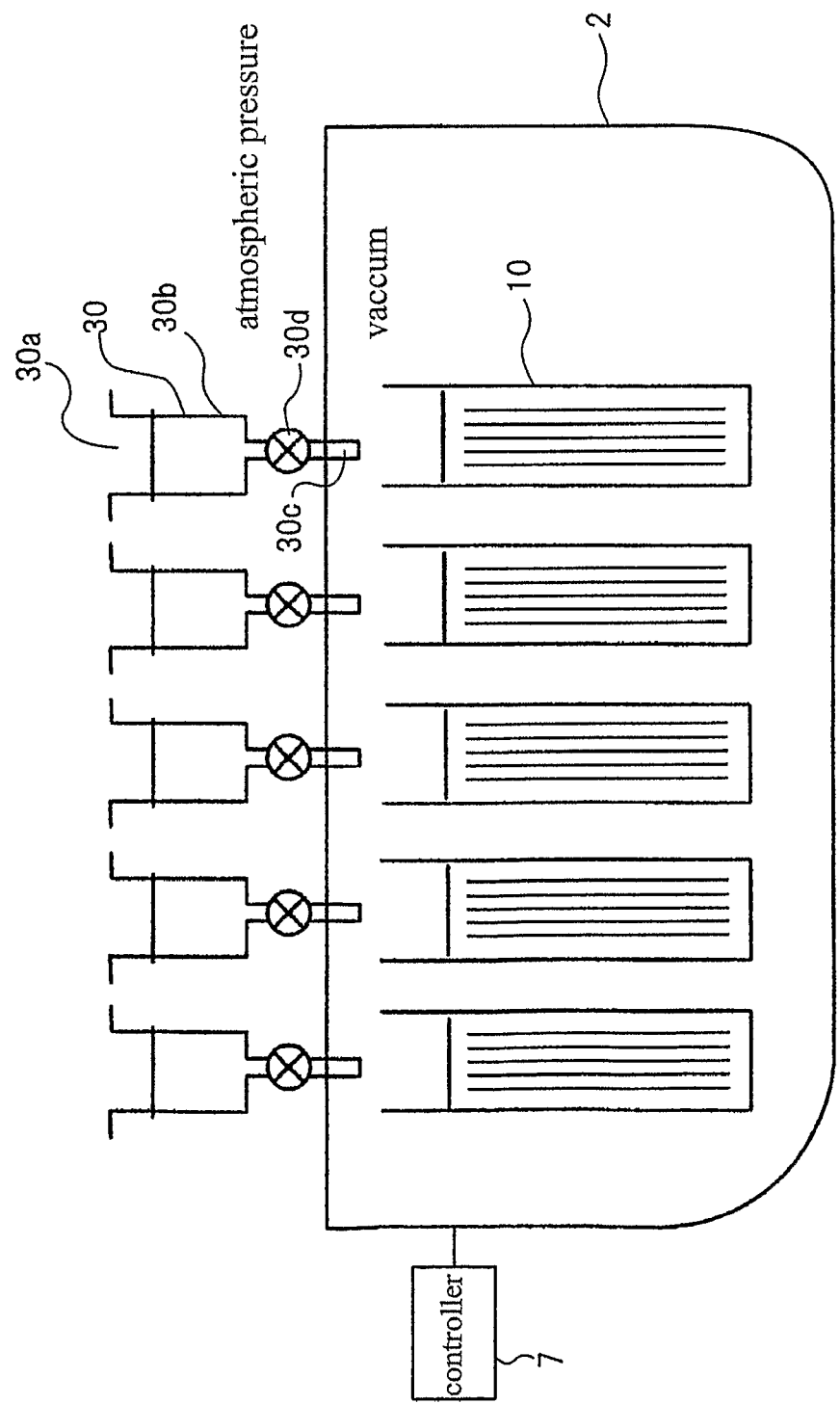
FIG. 11 is a schematic diagram showing another example of a system for supplying an electrolytic solution to bag-shaped laminate film containing a plurality of battery elements.

FIG. 11 shows another example of a system for supplying an electrolytic solution to bag-shaped laminate film containing a plurality of battery elements.

Configuration shown in FIG. 11 is the same as the configuration in FIG. 10 except that relay containers 30 are installed externally to vacuum container 2. More specifically, opening 30a, main body 30b, and valve 30d of each relay container 30 are installed outside the vacuum container 2 while the tip of supply port 30c is installed in vacuum container 2.

According to the configurations in FIGS. 9 and 10, since relay containers 30 are installed in vacuum container 2, electrolytic solution 20 is discharged from relay container 30 by gravity. On the other hand, the present configuration, which can use a pressure difference in addition to the force of gravity to supply an electrolytic solution, can supply electrolytic solution 20 into bag-shaped laminate film 12 rapidly. That is, with the configuration in FIG. 11, since relay containers 30 are exposed to atmospheric pressure while the tip of supply ports 30c are exposed to vacuum, electrolytic solution 20 can be sucked into vacuum container 2 under negative pressure.

Figure 12:
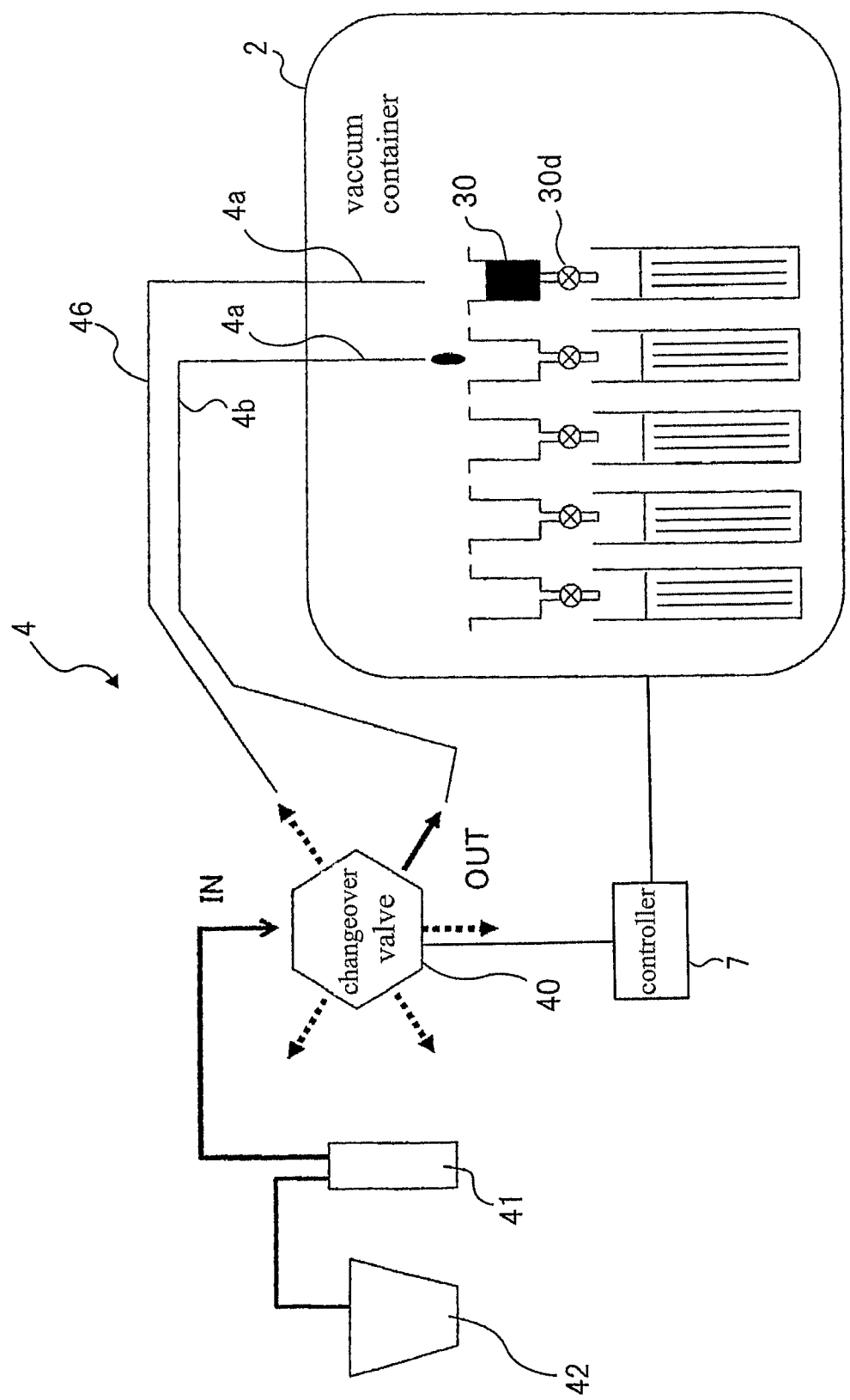
FIG. 12 is a schematic diagram showing another example of a system for supplying an electrolytic solution to bag-shaped laminate film containing a plurality of battery elements.

FIG. 12 shows another example of a system for supplying an electrolytic solution to a plurality of bag-shaped laminate film containing battery elements.

In the filling apparatus shown in FIG. 12, electrolytic-solution supply line 4 includes electrolytic solution tank 42, liquid delivery system 41, a plurality of supply pipes 4b, and changeover valve 40. Electrolytic solution tank 42 pools electrolytic solution 20. Liquid delivery system 41 delivers electrolytic solution 20 from electrolytic solution tank 42 to vacuum container 2. Changeover valve 40 is installed between liquid delivery system 41 and the plurality of supply pipes 4b.

In the filling apparatus shown in FIG. 1 and FIGS. 9 to 11, electrolytic-solution supply line 4 has a single supply pipe and a single needle connected to the supply pipe. According to the configurations shown in FIGS. 9 to 11, electrolytic solution 20 is supplied into multiple pieces of bag-shaped laminate film accommodating a battery element as the single needle is moved. On the other hand, according to the configuration shown in FIG. 12, supply pipes 4b and needles 4a are stationary, and changeover valve 40 is used to switch among supply pipes 4b and thus among needles 4a, and thereby supply electrolytic solution 20 in turns. In this way, eliminating the need for a mechanism to move supply pipes 4b and needles 4a simplifies equipment configuration as shown in FIG. 12.

(Mechanism for Maintaining Laminate Film in an Open State)

Figure 13:
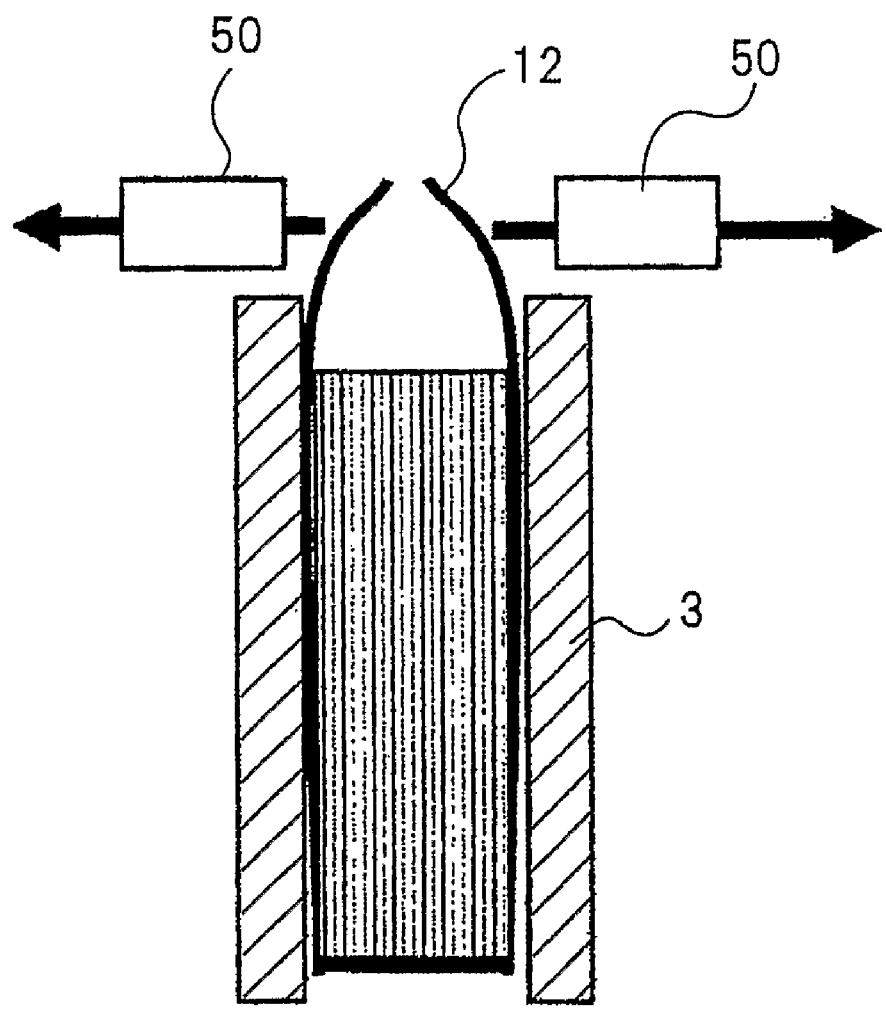
FIG. 13 is a schematic diagram showing an example of a mechanism for maintaining the laminate film in an open state.

FIG. 13 shows an example of a mechanism for maintaining laminate film 12 in an open state, according to the present embodiment.

A pair of suction apparatuses 50 can maintain laminate film 12 in an open state by pulling opening 12a of laminate film 12 from outside using vacuum suction.

Next, a method for maintaining an open state on a filling apparatus equipped with suction apparatus 50 will be described.

First, laminate film 12 is sucked while under vacuum in the atmosphere. Next, when laminate film 12 is opened, the needle of electrolytic-solution supply line 4 is inserted in opening 12a. Alternatively, a frame member may be inserted in opening 12a. After the needle or frame member is inserted, the suction operation of suction apparatus 50 may be stopped. Subsequently, electrolytic solution 20 is poured in an evacuated environment.

Figure 14A:
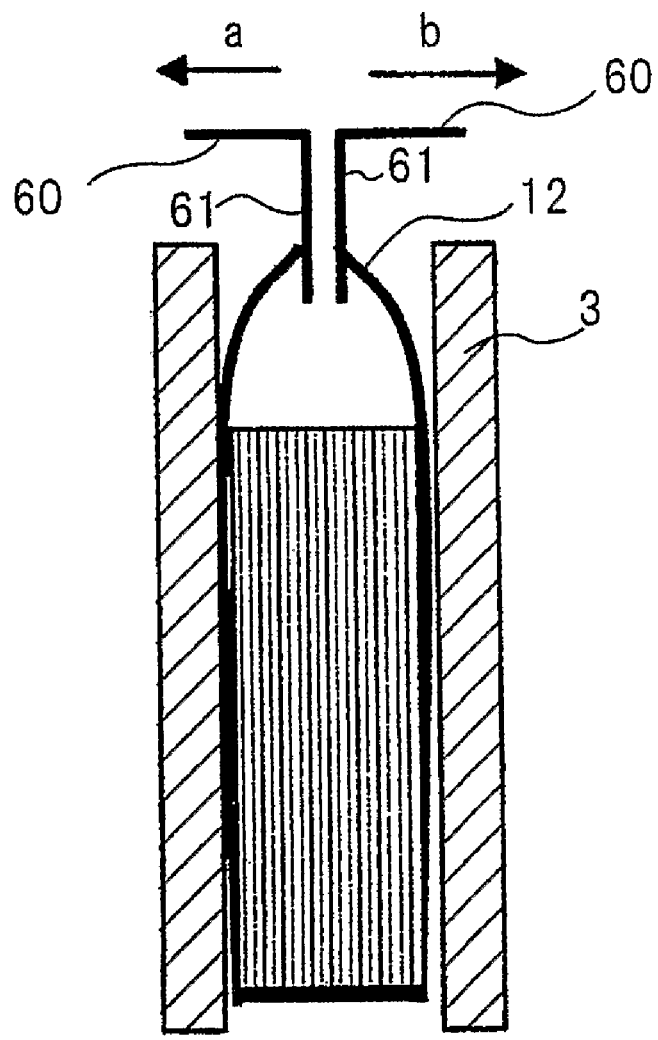
FIG. 14A is a schematic diagram showing another example of a mechanism for maintaining the laminate film in an open state.
Figure 14B:
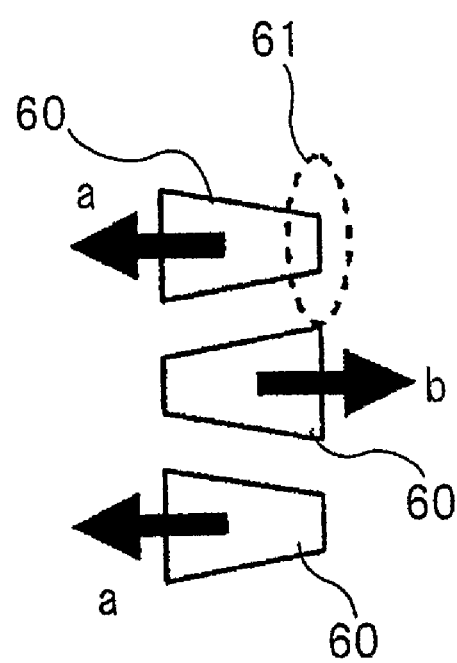
FIG. 14B is a schematic diagram illustrating a configuration and travel directions of claws in the mechanism shown in 14A.

FIGS. 14A and 14B show another example of the mechanism for maintaining laminate film 12 in an open state, according to the present embodiment.

As shown in FIG. 14A, the mechanism for maintaining an open state has a plurality of claws 60 each equipped with hook-shaped tip 61. As shown in FIGS. 14A and 14B, claws 60 include two types arranged alternately: claws movable in the direction of arrow a and claws movable in the direction of arrow b opposite the direction of arrow a.

Next, a method for maintaining an open state on a filling apparatus equipped with claws 60 will be described.

First, tips 61 of claws 60 are inserted in opening 12a of laminate film 12. Next, claws 60 are moved in direction a and direction b, thereby maintaining laminate film 12 in an open state.

Figures 15A, 15B:
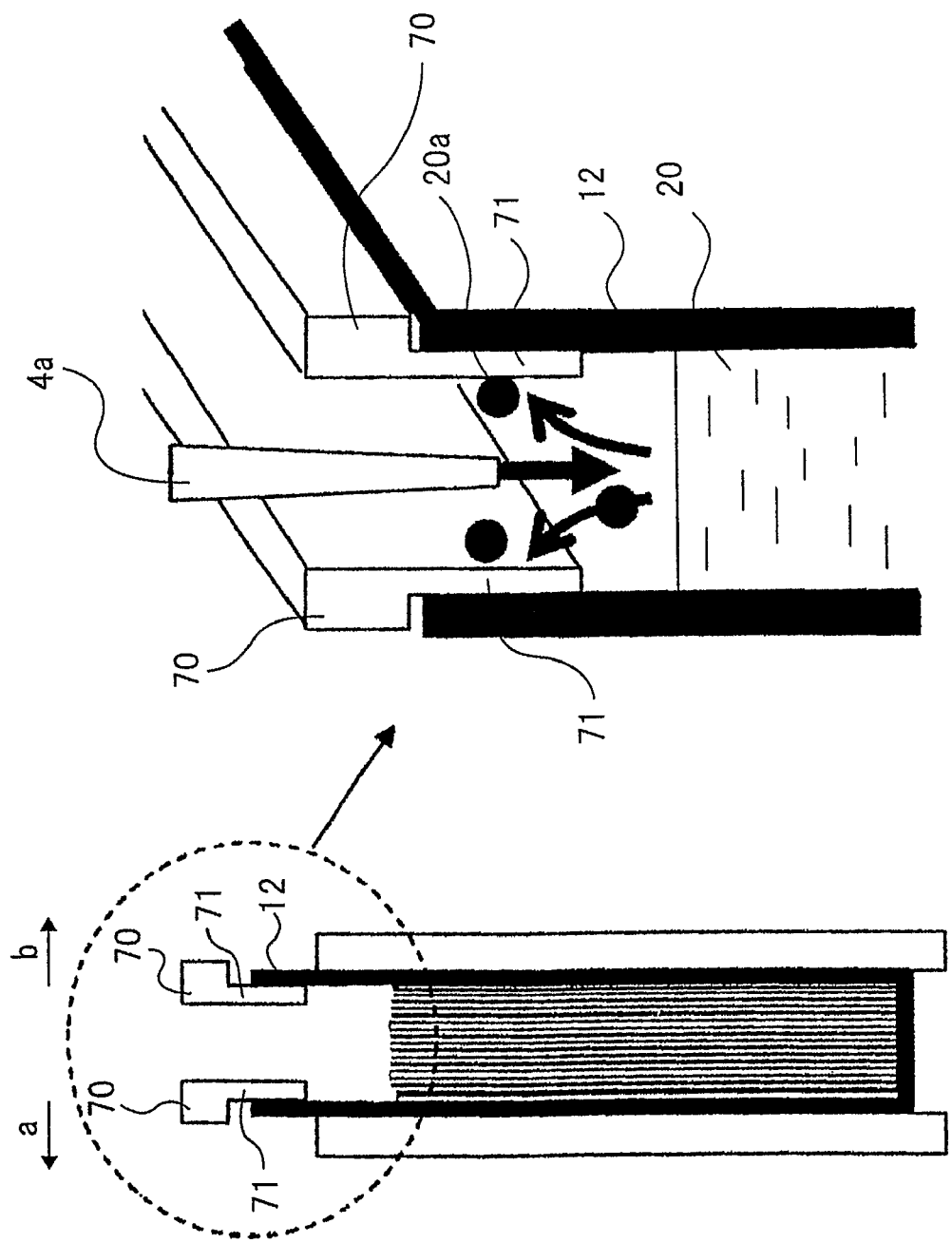
FIG. 15A is a schematic diagram showing another example of a mechanism for maintaining the laminate film in an open state.
FIG. 15B is a schematic diagram illustrating a configuration and travel directions of claws in the mechanism shown in 15A.

FIGS. 15A and 15B show another example of the mechanism for maintaining laminate film 12 in an open state, according to the present embodiment. A configuration shown in FIG. 15A maintains an open state using claws 70 equipped with tips 71. However, unlike claws 60 in FIGS. 14A and 14B, claws movable in the direction of arrow a and claws movable in the direction of arrow b are not arranged alternately. That is, as shown in FIG. 15B, claws 70 are placed one each on left and right sides: claw 70 movable in the direction of arrow a and claw 70 movable in the direction of arrow b. Tips 71 are shaped such as to entirely cover that part of laminate film 12 which is to be heat-fused. Thus, even if electrolytic solution 20 discharged from needle 4a spatters, the present configuration can prevent spatters 20a from attaching to that part of laminate film 12 which is to be heat-fused. In this way, claws 70 configured as shown in FIGS. 15A and 15B not only maintains laminate film 12 in an open state, but also prevents spatters 20a of electrolytic solution 20 from attaching to laminate film 12, enabling reliable heat fusion.

(Mechanism for Cleaning the Part of Laminate Film That is to be Heat Fused)

The present invention includes the process of temporarily pooling electrolytic solution 20 discharged from needle 4a on the sides of edge surfaces 11b of laminate film 12. Discharged electrolytic solution 20 may spatter and attach to that part of laminate film 12 which is to be heat-fused. Attached electrolytic solution 20 may obstruct reliable heat fusion. Thus, it is preferable to wipe off any electrolytic solution 20 that is attached to the area to be heat-fused.

Figure 16:
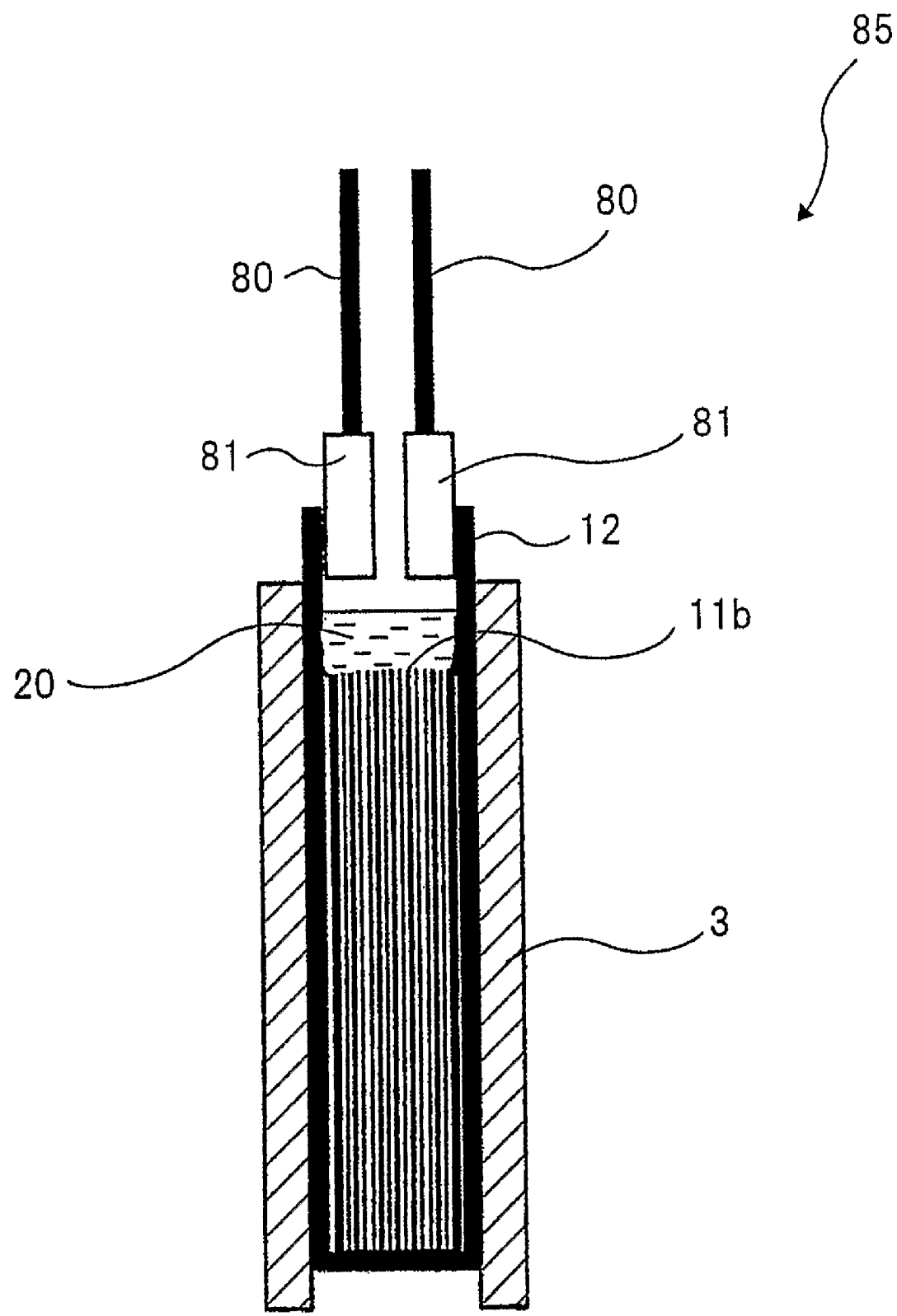
FIG. 16 is a schematic diagram showing an example of a mechanism for cleaning that part of laminate film which is to be heat-fused.

FIG. 16 shows an example of a mechanism for cleaning that part of laminate film which is to be heat-fused.

Cleaning mechanism 85 shown in FIG. 16 has wiper 81 at the tip of shaft 80. Preferably, wiper 81 is made of material such as nonwoven fabric or sponge which can be impregnated with electrolytic solution 20. After electrolytic solution 20 is poured, but before heat fusion, cleaning mechanism 85 is inserted in opening 12a of laminate film 12 and moved in the direction perpendicular to the plane of the paper in FIG. 16 with wiper 81 placed in contact with the area to be heat-fused in laminate film 12. This allows wiper 81 to wipe any electrolytic solution 20 off that area of laminate film 12 which is to be heat-fused.

Figure 17:
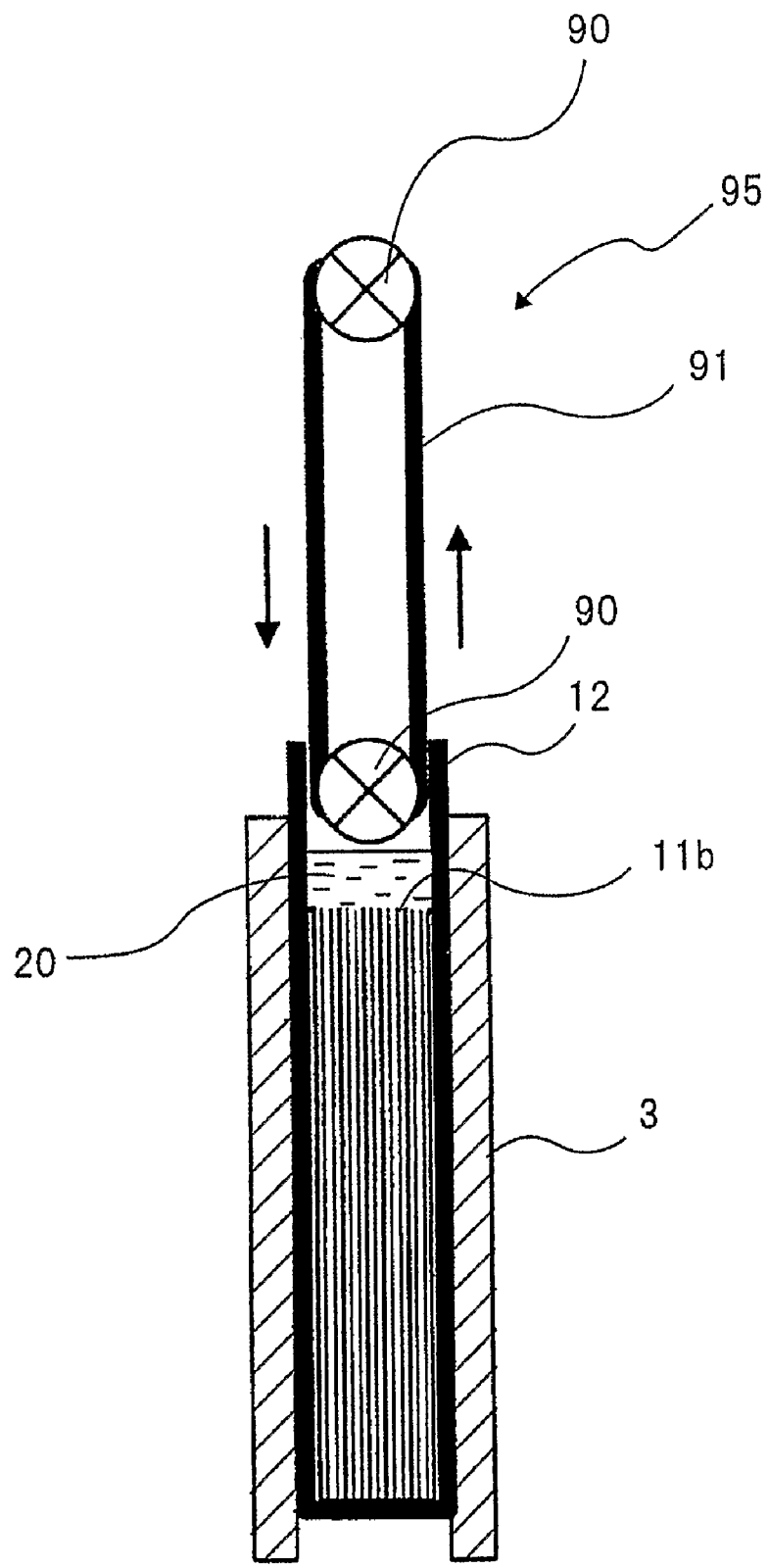
FIG. 17 is a schematic diagram showing another example of a mechanism for cleaning that part of laminate film which is to be heat-fused.

FIG. 17 shows another example of a mechanism for cleaning that part of laminate film which is to be heat-fused.

Cleaning mechanism 95 shown in FIG. 17 includes two pulleys 90 and wiping belt 91 installed over pulleys 90. Pulleys 90 can be rotated by a driver (not shown), driving, in turn, wiping belt 91.

A cleaning method using cleaning mechanism 95 will be outlined below.

After electrolytic solution 20 is poured, but before heat fusion, one of pulleys 90 of cleaning mechanism 95 is inserted in opening 12a of laminate film 12.

With wiping belt 91 placed in contact with that area of laminate film 12 which is to be heat-fused, cleaning mechanism 95 is moved in the direction perpendicular to the plane of the paper in FIG. 17. Consequently, wiping belt 91 wipes any electrolytic solution 20 off that area of laminate film 12 which is to be heat-fused. Subsequently, before cleaning any other piece of laminate film 12, pulleys 90 are rotated by a predetermined amount. That is, pulleys 90 are rotated so as to retract that part of wiping belt 91 which has been contaminated as a result of cleaning and pulley 90 bring a clean part of wiping belt 91 into contact with that area of laminate film 12 which is to be heat-fused.

In this way, cleaning mechanism 95 can clean that area of laminate film 12 which is to be heat-fused always using an uncontaminated cleaning surface of wiping belt 91. This ensures more reliable cleaning and thereby enables more reliable heat fusion.

(Method for Heat-Fusing Laminate Film)

According to the present invention, filling with electrolytic solution 20 is done in vacuum container 2. Thus, if laminate film 12 is heat-fused with vacuum container 2 evacuated, an additional process of evacuation can be omitted.

The present invention has been described with reference to an embodiment, but the present invention is not limited to the embodiment described above. It is to be understood that various changes and modifications which may occur to those skilled in the art may be made to the configuration and details of the present invention without departing from the scope of the present invention.

This application claims priority from Japanese Patent Application No. 2008-20951 filed Jan. 31, 2008, which is incorporated herein by reference in its entirety.

The invention claimed is:

1. A manufacturing method for a film-covered electrical device, comprising:
holding, in a vacuum container, a bag-shaped laminate film that contains a power generating element and that has an opening, by pinching the bag-shaped laminate film at positions corresponding to two principal surfaces of the power generating element, the power generating element having a positive layer and a negative layer stacked via a separator;

reducing pressure in the vacuum container;

pouring an electrolytic solution into the bag-shaped laminate film through the opening with the pressure in the vacuum container kept reduced until the level of the electrolytic solution becomes higher than the top end of the power generating element; and increasing the reduced pressure in the vacuum container, wherein the electrolytic solution is poured under conditions given by:

$$0 < 2V_W + V_L < V_{TOTAL}$$

$$0 < V_W, 0 < V_L$$

where L and W are length and width of the power generating element; $V_L$ is a volume formed between the laminate film and an edge surface at a bottom opposite to an edge surface located at the opening from among the edge surfaces of the power generating element; $V_W$ is a volume formed between the laminate film and an edge surface, which joins the edge surface at the bottom and the edge surface at the opening from among the edge surfaces of the power generating element; and $V_{TOTAL}$ is a total volume of the electrolytic solution poured into the bag-shaped laminate film.

2. The manufacturing method for a film-covered electrical device according to claim 1, wherein in the holding, the entire principal surfaces of the power generating element are held, with edge surfaces of the power generating element left free.

3. The manufacturing method for a film-covered electrical device according to claim 1, wherein in the pouring, the electrolytic solution is poured into the bag-shaped laminate film via a relay container.

4. The manufacturing method for a film-covered electrical device according to claim 3, wherein in the pouring step, the electrolytic solution is poured into a plurality of pieces of the bag-shaped laminate film in sequence or all at once via the relay container, with the plurality of pieces of the bag-shaped laminate film containing the power generating element, wherein the plurality of pieces of the bag-shaped laminate film are in the vacuum container and are pinched at positions corresponding to the two principal surfaces of the power generating element.

5. The manufacturing method for a film-covered electrical device according to claim 3, wherein the relay container pours the electrolytic solution from the relay container into the bag-shaped laminate film using a pressure difference between pressure of the atmosphere and reduced pressure in the vacuum container.

6. The manufacturing method for a film-covered electrical device according to claim 3, wherein the electrolytic solution is supplied by electrolytic-solution supplier that is movably installed.

7. The manufacturing method for a film-covered electrical device according to claim 6, wherein the electrolytic-solution supplier: includes a pool which pools the electrolytic solution and a plurality of needles which discharges the electrolytic solution supplied from the pool; and supplies the electrolytic solution through one needle selected from the plurality of needles as a destination of the electrolytic solution supplied from the pool.

8. The manufacturing method for a film-covered electrical device according to claim 1, wherein the opening is maintained in an open state from the time before pouring of the electrolytic solution starts until the time when pouring of the electrolytic solution is finished.

9. The manufacturing method for a film-covered electrical device according to claim 8, wherein the open state is maintained by suction at the opening.

10. The manufacturing method for a film-covered electrical device according to claim 8, wherein the open state is maintained by moving a pair of claws inserted in the opening, in a direction away from each other.

11. The manufacturing method for a film-covered electrical device according to claim 10, wherein the open state is maintained with part to be heat-fused at the opening being covered by the pair of claws.

12. The manufacturing method for a film-covered electrical device according to claim 1, further comprising removing any the electrolytic solution attached to the opening.

13. The manufacturing method for a film-covered electrical device according to claim 1, wherein the electrolytic solution is poured under conditions given by:

$$V_L \leq (2/W) \cdot (L - W/2) \cdot V_W.$$

14. The manufacturing method for a film-covered electrical device according to claim 4, wherein the electrolytic solution is supplied by electrolytic-solution supplier that is movably installed.

15. The manufacturing method for a film-covered electrical device according to claim 5, wherein the electrolytic solution is supplied by electrolytic-solution supplier that is movably installed.

16. The manufacturing method for a film-covered electrical device according to claim 2, wherein the opening is maintained in an open state from the time before pouring of the electrolytic solution starts until the time when pouring of the electrolytic solution is finished.

17. The manufacturing method for a film-covered electrical device according to claim 3, wherein the opening is maintained in an open state from the time before pouring of the electrolytic solution starts until the time when pouring of the electrolytic solution is finished.

* * * * *